(12) United States Patent
Zimmerman et al.

(10) Patent No.: US 7,567,666 B2
(45) Date of Patent: *Jul. 28, 2009

(54) METHOD AND APPARATUS FOR CROSSTALK MITIGATION

(75) Inventors: George A. Zimmerman, Rolling Hills Estates, CA (US); William W. Jones, Aliso Viejo, CA (US)

(73) Assignee: Solarflare Communications, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/650,190

(22) Filed: Jan. 4, 2007

(65) Prior Publication Data

US 2009/0116639 A1    May 7, 2009

Related U.S. Application Data

(63) Continuation of application No. 10/603,498, filed on Jun. 24, 2003, now Pat. No. 7,164,764.

(60) Provisional application No. 60/471,180, filed on May 16, 2003, provisional application No. 60/424,961, filed on Nov. 7, 2002.

(51) Int. Cl.
*H04M 9/00* (2006.01)
(52) U.S. Cl. .................. 379/417; 375/296; 370/201; 370/282
(58) Field of Classification Search ........... 379/414–17; 370/201, 282–92
See application file for complete search history.

(56) References Cited

U.S. PATENT DOCUMENTS 4,359,778 A    11/1982 Lee
4,583,235 A    4/1986 Dömer et al.
4,878,232 A    10/1989 Fisher (Continued)

FOREIGN PATENT DOCUMENTS

EP    0250048    12/1987

(Continued)

OTHER PUBLICATIONS

Gi-Hong Im, et al., "Performance of a Hybrid Decision Feedback Equalizer Structure for CAP-Based DSL Systems", *IEEE Transactions on Signal Processing* vol. 49, No. 8, Aug. 2001, pp. 1768-1785.

(Continued)

*Primary Examiner*—Walter F Briney, III
(74) *Attorney, Agent, or Firm*—Weide & Miller, Ltd.

(57) ABSTRACT

A method and apparatus for noise cancellation in a multichannel communication system is disclosed. In one embodiment this system is configured to cancel FEXT on a victim channel utilizing the signals received on the other channels. The processing benefits gained by a receiver's other filters, such as for example, the FFE and DFE filters, is utilized when generating a FEXT cancellation signal. As a result, the complexity of the apparatus that generates the FEXT cancellation signal may be made less complex since part of the processing burden is performed by other filter apparatus. In one configuration pre-code FEXT cancellation occurs in that a pre-code FEXT filter generates one or more pre-code FEXT cancellation signals corresponding to each of the other channels. The pre-code FEXT cancellation signals are combined, prior to transmission, with the signals associated with each of the other channels, to thereby pre-cancel FEXT prior to transmission.

15 Claims, 17 Drawing Sheets

U.S. PATENT DOCUMENTS

| | | |
|---|---|---|
| 4,956,838 A | 9/1990 | Gilloire et al. |
| 5,222,084 A | 6/1993 | Takahashi |
| 5,249,200 A | 9/1993 | Chen et al. |
| 5,293,402 A | 3/1994 | Crespo et al. |
| 5,305,307 A | 4/1994 | Chu |
| 5,307,405 A | 4/1994 | Sih |
| 5,315,585 A | 5/1994 | Iizuka et al. |
| 5,388,124 A | 2/1995 | Laroia et al. |
| 5,633,863 A | 5/1997 | Gysel et al. |
| 5,646,958 A | 7/1997 | Tsujimoto |
| 5,825,753 A | 10/1998 | Betts et al. |
| 5,856,970 A | 1/1999 | Gee et al. |
| 5,896,452 A | 4/1999 | Yip et al. |
| 5,903,546 A | 5/1999 | Ikeda et al. |
| 5,909,466 A | 6/1999 | Labat et al. |
| 6,028,929 A | 2/2000 | Laberteaux |
| 6,081,502 A | 6/2000 | Paneth et al. |
| 6,088,827 A | 7/2000 | Rao |
| 6,147,979 A | 11/2000 | Michel et al. |
| 6,160,790 A | 12/2000 | Bremer |
| 6,167,082 A | 12/2000 | Ling et al. |
| 6,178,162 B1 | 1/2001 | Dal Farra et al. |
| 6,201,831 B1 | 3/2001 | Agazzi et al. |
| 6,212,225 B1 | 4/2001 | Agazzi |
| 6,226,332 B1 | 5/2001 | Agazzi et al. |
| 6,236,645 B1 | 5/2001 | Agazzi |
| 6,249,544 B1 | 6/2001 | Azazzi et al. |
| 6,252,904 B1 | 6/2001 | Agazzi et al. |
| 6,253,345 B1 | 6/2001 | Agazzi et al. |
| 6,259,729 B1 | 7/2001 | Seki |
| 6,272,173 B1 | 8/2001 | Hatamian |
| 6,285,653 B1 | 9/2001 | Koeman et al. |
| 6,297,647 B2 | 10/2001 | Kirk et al. |
| 6,304,598 B1 | 10/2001 | Agazzi et al. |
| 6,324,170 B1 | 11/2001 | McClennon et al. |
| 6,351,531 B1 | 2/2002 | Tahernezhaadi et al. |
| 6,356,555 B1 | 3/2002 | Rakib et al. |
| 6,433,558 B1 | 8/2002 | Sciacero et al. |
| 6,463,041 B1 | 10/2002 | Agazzi |
| 6,480,532 B1 | 11/2002 | Vareljian |
| 6,493,448 B1 | 12/2002 | Mann et al. |
| 6,553,085 B1 | 4/2003 | Trans |
| 6,584,160 B1 | 6/2003 | Amrany et al. |
| 6,618,480 B1 | 9/2003 | Polley et al. |
| 6,665,402 B1 | 12/2003 | Yue et al. |
| 6,687,235 B1 | 2/2004 | Chu |
| 6,751,255 B1 | 6/2004 | Reuven et al. |
| 6,792,038 B2 | 9/2004 | Agazzi |
| 6,813,311 B1 | 11/2004 | Pal et al. |
| 6,819,709 B1 | 11/2004 | Agazzi et al. |
| 6,826,226 B1 | 11/2004 | Sahlin et al. |
| 6,862,326 B1 | 3/2005 | Eran et al. |
| 6,898,281 B1 | 5/2005 | Larsson et al. |
| 6,961,373 B2 | 11/2005 | Jones |
| 7,002,897 B2 | 2/2006 | Jones et al. |
| 7,110,449 B2 | 9/2006 | Heo et al. |
| 7,133,425 B2 | 11/2006 | McClellan |
| 7,164,764 B2 * | 1/2007 | Zimmerman et al. ........ 379/417 |
| 2001/0036160 A1 | 11/2001 | Curran et al. |
| 2002/0067824 A1 | 6/2002 | Wang |
| 2002/0106016 A1 | 8/2002 | Egelmeers et al. |
| 2002/0176492 A1 | 11/2002 | Zangi et al. |
| 2002/0191552 A1 | 12/2002 | Watkinson |
| 2003/0063663 A1 | 4/2003 | Bryant |
| 2003/0067888 A1 | 4/2003 | Bina et al. |
| 2003/0099208 A1 | 5/2003 | Graziano et al. |
| 2004/0001540 A1 | 1/2004 | Jones |
| 2004/0022311 A1 * | 2/2004 | Zerbe et al. ................. 375/229 |
| 2004/0125487 A9 | 7/2004 | Sternad et al. |
| 2005/0157811 A1 | 7/2005 | Bjerke et al. |

OTHER PUBLICATIONS

Eyuboglu M V., "Flexible Precoding for V.Fast", Data Transmission—Advances in Modem and ISDN Technology and Applications, 1992., UK, IEE, UK 1992, pp. 13-18.

Shao-Po Wu, et al., "FIR Filter Design via Spectral Factorization and Convex Optimization", to appear as Chapter 1 of *Applied Computational Control, Signal and Communications*, Biswa Datta Editor, Birkhauser, 1997, pp. 1-33.

"Electric Machinery: Chap. 2 Transformers—Dot Convention to Denote the Polarity of a Transformer", http://pemclab.cn.netu.edu.tw/W3elemac/W3slide/ch2.xformer/sld009.htm Sep. 18, 1995, 1 page.

"Transformer Polarity", Copyright 2002 Kilowatt Classroom, 11C, 1 page.

"Application Note—Design of H.F. Wideband Power Transformers; Part II—EC07213", Philips Semiconductors, Mar. 23, 1998, pp. 1-10.

"Technical Information—Use of Ferrites in Broadband Transformers", Fair-Rite Products Corp., 14$^{th}$ Edition, pp. 170-173 (Date Unknown).

Peter Kabal, et al., "Partial-Response Signaling", *IEEE Transactions on Communications*, vol. COM-23, No. 9, Sep. 1975, pp. 921-934.

Huiting Chen, et al., "Current Mirror Circuit with Accurate Mirror Gain for Low β Transistors", supported in part by Dallas Semiconductor Corp., 4 pages (Date Unknown).

M. Tomlinson, "New Automatic Equaliser Employing Modulo Arithmetic", *Electronic Letters*, vol. 7, 1971, pp. 138-139.

Robert F. H. Fischer, et al. "Dynamics Limited Precoding, Shaping, and Blind Equalization for Fast Digital Transmission Over Twisted Paair Lines", *IEEE Journal on Selected Areas in Communications*, vol. 13, No. 9, Dec. 1995, pp. 1622-1633.

Robert F. H. Fischer, et al., "Comparison of Precoding Schemes for Digital Subscriber Lines", *IEEE Transactions on Communications*, vol. 45, No. 3, Mar. 1997, pp. 334-343.

Hiroshi Harashima, et al., "Matched-Transmission Technique for Channels with Intersymbol Interference", *IEEE Transactions on Communications*, vol. COM-20, No. 4, Aug. 1972, pp. 774-780.

A. Hekersdorf, et al., "A Scalable SDH/SONET Framer Architecture for DATACOM and TELCO Applications", IBM Reserch, Zurich Research Laboratory, Switzerland, 8 pages (Date Unknown).

"Gigabit Ethernet Over Category-5", Copyright 2000-2001 Agilent Technologies, 12 pages.

Christopher T. DiMinico of Cable Design Technologies (CDT) Corporation, Massachusetts and Paul Kish of NORDX/CDT, Montreal Canada, "Development of Equal Level Far-End Crosstalk (ELFEXT) and Return Loss Specifications for Gigabit Ethernet Operation on Category 5 Copper Cabling", 10 pages (Date Unknown).

M.P. Sellers, et al., "Stabilized Precoder for Indoor Radio Communications", *IEEE Communications Letters*, vol. 4, No. 10, Oct. 2000, pp. 315-217.

"Wirescope 350—Understanding ELFEXT", © 2000 Ailgent Technologies, 2 pages.

Pedro Silva, et al., "Precoder Circuit for Channels with Mulitpath Dispersion", Telecommunications Institute, Department of Electronics and Telecommunications Engineering, the University of Aveiro—University Campus, Portugal, 4 pages (Date Unknown).

David Crawford, "Adaptive Filters", © David Crawford 1996, pp. 1-5.

"Tutorial: Adaptive Filter, Acoustic Echo Chanceller, and its Low Power Implementation", © of Freehand Communications AB, 6 pages (Date Unknown).

David A. Johns, et al., "Integrated Circuits for Data Transmission Over Twisted Pair Channels", *IEEE Journal of Solid-State Circuits*, vol. 32, No. 3, Mar. 1997, pp. 398-406.

Prof. David Johns, University of Toronto, "Equalization", © D.A. Johns 1997, 29 pages.

Shao-Po Wu, et al., "FIR Filter Design via Semidefinite Programming and Spectral Factorization", Information Systems Laboratory, Stanford University, CA, 6 pages (date unknown).

David Smalley, "Equalization Concepts: A Tutorial", Atlanta Regional Technology Center, Texas Instruments, Oct. 1994, pp. 1-29.

Richard D. Wesel, et al., "Achievable Rates for Tomlinson-Harashima Precoding", *IEEE Transactions on Information Theory*, vol. 44, No. 2, Mar. 1998, pp. 824-831.

Wolfgang H. Gerstacker, et al., "Blind Equalization Techniques for xDSL Using Channel Coding and Precoding", submitted to AEÜ Int. J. Electr.Commun.,. May 1999, pp. 1-4.

J. Ježek, Institute of Information Theory and Automation, Prague, Czech Republic, et al., "New Algorithm for Spectral Factorization and its Practical Application", pp. 1-6 (Date Unknown).

Chip Fleming, "A Tutorial on Convolutional Coding and Viterbi Decoding", © 1999-2002, Spectrum Applications, pp. 1-6.

"ADSL Tutorial", http://www.dslforum.org/aboutdsl/ads1_tutorial.html, 3 pages, (Date Unknown).

"Introduction to DSP", http://www.bores.com/courses/intro/filters/4_fir.htm, 2 pages (Date Unknown).

"QAM_VR-QAM Demodulator with Variable Rate", DesignObjects™ by sci-worx, 2 pages (Date Unknown).

"ELFEXT—Introduction", Fluke Networks™, © 2000, pp. 1-2.

"Description of Algorithms (Part 1)", http://pw1.netcom.com/~chip.f;viterbi/algrthms.html., 7 pages (Date Unknown).

"Fast Fourier Transform", http://cas.ensmp.fr/~chaplais/Wavetour_presentation/transformees/Fourier/FFTUS.html, 2 pages (Date Unknown).

"Continuous Time Aperiodic Signals: The Fourier Transform", http://ece.ucsd.edu/~cruz/ece.101/notes/node32.html, 2 pages (Date Unknown).

"Convolution", http://www.wam.umd.edu/~toh/spectrum/Convolution.html, 2 pages (Date Unknown).

"Convolution by DFT", http://www.gresilog.com/english/excommen/doc/convtd.htm, 3 pages (Date Unknown).

"Iowegian's dspGuru FIR FAQ Part 2: Properties", © 1999-2000 Iowegian International Corp., pp. 1-4.

"28.5 Protocol Implementation Conformance Statement (PICS) Proforma for Clause 28, Physical Layer Link Signaling for 10 Mb/s, 100 Mb/s and 1000 Mb/s Auto-Negotiation on Twisted Pair", *IEEE Std. 802.3*, 1998 Edition, pp. 6-14 and 18-44.

Jamie E. Kardontchik, "4D Encoding in Level-One's Proposal for 1000BAS-T", Advanced Micor Devices, Aug. 21, 1977—Rev. B, pp. 1-24.

Gottfried Ungerboeck, "Trellis-Coded Modulation with Redundant Signal Sets", *IEEE Communications Magazine*, Feb. 1987, vol. 25, No. 2, pp. 5-21.

Oscar Agazzi, et al., "10Gb/s PMD Using PAM-5 Trellis Coded Modulation", Broadcom, *IEEE 802.3*, Albuquerque, New Mexico, Mar. 6-10, 2000, 38 pages.

Mehdi Hatamian, et al., "Design Considerations for Gigabit Thernet 1000Bast-T Twisted Pair Transceivers", IEEE 1998 Custom Integrated Circuits Conference, pp. 335-342.

Eric F. Haratsch, et al., "A 1-Gb/s Joint Equalizer and Trellis Decoder for 1000BASE-T Gigabit Ethernet", *IEEE Journal of Solid-State Circuits*, vol. 36, No. 3, Mar. 2001, pp. 374-384.

Defination of Minimum Phase; www.ccrma.stanford.edu/-jos/filters/definition_Minimum_Phase.html, 3 pages, Apr. 2007.

Li,M., et al., "FIR filter optimization as pre-emphasis of high-speed backplane data transmission", Electronics Letters, 8th, Jul. 2004; vol. 40, No. 14.

* cited by examiner

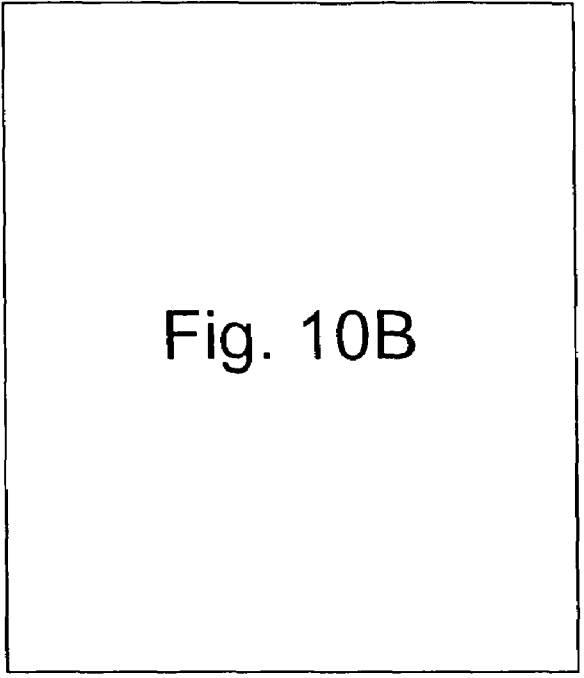
Fig. 10B
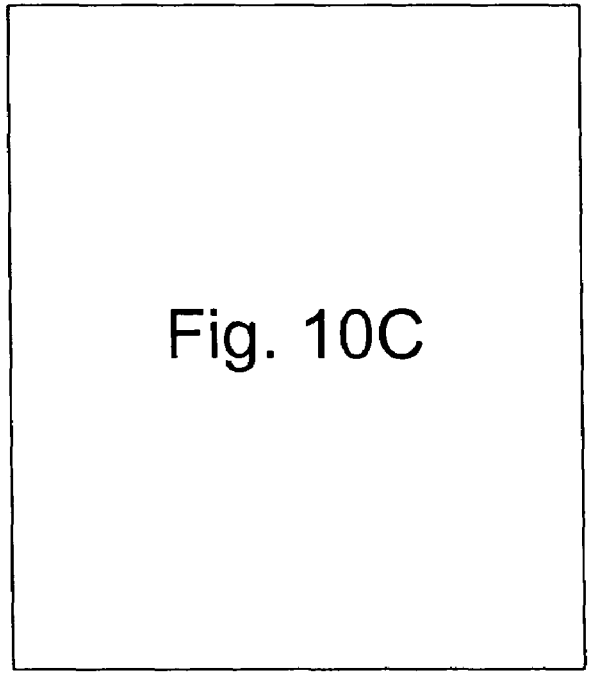
Fig. 10C
Fig. 10A

METHOD AND APPARATUS FOR CROSSTALK MITIGATION

PRIORITY CLAIM

This application is a continuation of U.S. patent application Ser. No. 10/603,498 which was filed Jun. 24, 2003 now U.S. Pat. No. 7,164,764, which in turn claims priority to provisional patent application Ser. No. 60/424,961 filed on Nov. 7, 2002 entitled METHOD AND APPARATUS FOR EQUALIZATION AND CROSSTALK MITIGATION and provisional patent application Ser. No. 60/471,180 filed on May 16, 2003 entitled METHOD AND APPARATUS FOR EQUALIZATION AND CROSSTALK MITIGATION.

FIELD OF THE INVENTION

The invention relates to communication systems and, in particular, to a method and apparatus for equalization and crosstalk mitigation.

RELATED ART

Modern communication systems achieve data communication between transceivers located at remote locations. To increase data communication rates, communication system cabling arrangements often include numerous conductors in close proximity to transport a signal between remote locations. These systems may be referred to as multi-channel communication systems. Furthermore, communication devices are often constructed on circuit boards containing numerous conductors, traces, or electrical devices. In all of these instances, coupling between channels of a multi-channel communication system may occur, thereby introducing interference into the other channels. This type of interference is generally referred to as crosstalk.

As is commonly understood, crosstalk may be characterized as near end crosstalk (NEXT) and far end crosstalk (FEXT), depending on the source of the crosstalk that is introduced and the recipient or victim of the crosstalk. FIG. 1 illustrates an example transceiver system with FEXT coupling. As shown a first set of transceivers 104A-104D is part of Station A 102, which is located at a first location. Station A 102 communicates over channels 108A-108D with a second set of transceivers 112A-112D that are part of Station B 110 and which are located at a second location. FEXT type crosstalk is shown in FIG. 1 by coupling lines 116AB, 116AC, and 116AD with channel 108A as a victim channel. Signals on each of the adjacent channels, i.e., the disturber signals on the disturber channels, often couple into the victim channel 108A and thereby interfere with reception of the desired signal being transmitted on the victim channel. For example, the signal on channel 108A will have coupling from the signals transmitted onto Channels 108B-108D.

Similarly, the signal transmitted over the victim channel 108A may couple onto the other channels 108B-108D. These coupling signals are shown in FIG. 1 as coupling signals 120BA, 120CA, and 120DA. Hence, the processing and decoding of the signals transmitted over channels 108A-108D is made more difficult by the coupling that occurs between channels.

While attempts have been made to overcome the effects of coupling, none of these attempts adequately reduces the presence or effects of crosstalk. One such attempt is detailed in U.S. Pat. No. 6,236,645 issued to Agazzi. The Agazzi reference teaches a cancellation system associated with each receiver in a multi-receiver system. The cancellation system disclosed in the Agazzi reference may be characterized as utilizing tentative decisions to reduce the effects of coupling onto a signal by making assumptions about the signal, such as a symbol value, that was sent on another channel. The tentative decision may be described as a guess regarding a symbol value that was sent on the channel.

The Agazzi reference does not, however, eliminate sufficient coupling to overcome all the drawbacks of the prior art, and hence, even when adopting the teachings of the Agazzi reference, coupling continues to interfere with isolation of the received signal. One particular drawback to the teachings of the Agazzi reference is that the system of the Agazzi reference continues to suffer from decision device error resulting from crosstalk corruption of a signal because it makes tentative decisions based on the analysis of a signal that includes an unacceptable amount of noise or coupling. Incorrect decisions may occur as a result, thereby increasing error rates. Further, the filter proposed for use by the Agazzi reference is undesirably complex, since it must span the convolution of the channel response with the coupling response. This undesirably limits processing speeds.

Furthermore, prior art solutions often do not address many aspects of coupling signal cancellation. Such aspects include coupling that occurs at frequencies that differ from that of the disturber signal and signals that couple into the victim signal yet propagate through the victim channel at rates different from that of the disturber signal.

The method and apparatus disclosed herein overcomes the drawbacks of the prior art and enables more accurate signal decoding and processing than previously possible. Moreover, transmission at higher data rates with lower error rates, as compared to the prior art, is also enabled.

SUMMARY

To overcome the drawbacks of the prior art, disclosed herein is a multi-channel communication system having a first station and a second station configured to communicate over two or more channels. In one embodiment, this system comprises a first station having two or more transmitters configured to send two or more transmitted signals over two or more channels from the first station to the second station. Also part of this embodiment is a second station having two or more receivers configured to process a received signal wherein each received signal comprises the transmitted signal and one or more coupling signals. In this embodiment at least one of the receivers may comprise a decision device configured to generate a decision output based on at least the received signal and a modified decision output. A feedback system is provided and configured to generate the modified decision output and combine the modified decision output, the received signal, and one or more incoming FEXT cancellation signals. An adder is part of the receiver and is configured to add the modified decision output from the decision output to create an intermediate signal and one or more ELFEXT filters are also provided and configured to process the intermediate signal to create one or more outgoing FEXT cancellation signals.

It is contemplated that the communication system may be further configured to transmit data from the second station to the first station. In addition, the one or more incoming cancellation signals comprise one or more cancellation signals configured to remove FEXT coupling from the received signal and the adder may be further configured to add the modified decision output to one or more incoming cancellation signals arriving from the decision output to create the intermediate signal. In one embodiment the ELFEXT filter is configured to account for an ELFEXT portion of FEXT coupling. In one embodiment each receiver at the second station generates a unique cancellation signal tailored for each of the other receivers at the second station. It is contemplated that the feedback system may comprise a decision feedback filter and that the decision device may comprise a slicer. In one embodiment, the multi-channel communication system comprises a four-channel communication system configured to operate in accordance with an Ethernet Communication Standard and each transmitter may comprise one or more FEXT precode filters configured to generate and provide one or more precode cancellation signals to other transmitters.

Also disclosed herein is a multi-channel communication system configured to reduce noise. In one embodiment this system comprises one or more transmitters configured to transmit a first signal on a first channel and a second signal on a second channel. Also part of this system is a first receiver configured to receive a third signal on the first channel and a second receiver configured to receive a fourth signal on the second channel, wherein the third signal comprises the first signal and a first interference component and the fourth signal comprises the second signal and a second interference component.

In this configuration, the first receiver comprises the following parts. A first feedback filter loop that is configured to receive the third signal and reduce interference on the third signal such that the output of the first feedback filter loop comprises a first feedback filter loop output and a first decision device having a first decision device output configured as part of the first feedback filter loop. The first device is provided and configured to receive a second cancellation signal from the second receiver and combine the second cancellation signal with the first feedback filter loop output. A first filter is configured to receive at least the decision device output and generate a first cancellation signal.

A second receiver comprises a second feedback filter loop that is configured to receive the fourth signal and reduce interference on the fourth signal such that the output of the second feedback filter loop comprises a second feedback filter loop output. A second decision device is provided to create a second decision device output configured as part of the second feedback filter loop. A second device is configured to receive the first cancellation signal from the first receiver and combine the first cancellation signal with the first feedback filter loop output. A second filter is configured to receive at least the second decision device output and generate the second cancellation signal.

In one embodiment, the first device and the second may comprise summing junctions. In one embodiment the first feedback filter loop and the second feedback filter loop both comprise a decision feedback filter configured to reduce intersymbol interference. In one configuration the multi-channel communication system has four channels and the interference comprises FEXT coupling. The first filter and the second filter may comprise digital filters having coefficient values selected to generate cancellation signals that cancel FEXT coupling. In one embodiment, the one or more transmitters further comprise precode FEXT filters such that each precode FEXT filter is configured to generate a cancellation signal that can be combined with a signal, prior to transmission of the signal, to pre-cancel FEXT coupling. Moreover, at least one of the one or more transmitters may be configured to generate an outgoing precode cancellation signal and receive an incoming precode cancellation signal from another transmitter.

In another embodiment a receiver for use in a multi-channel communication system to cancel coupling on a transmitted signal and reduce intersymbol interference is provided wherein a distorted version of a transmitted signal and FEXT coupling comprise a combined signal. The receiver comprises a first device configured to receive and combine a feedback signal with the combined signal to create a decision device input signal and a decision device configured to process the decision device input signal to generate a discrete output. A decision feedback equalizer is also provided and is configured to receive and process the discrete output to generate an equalizer output. A second device is provided to combine an incoming cancellation signal with the equalizer output to create the feedback signal. Also part of this embodiment are one or more ELFEXT filters, each configured to generate an outgoing cancellation signal that is related to the discrete output, wherein the outgoing cancellation signal is tailored to cancel FEXT coupling on another channels in the multi-channel communication device.

In one variation, the system further comprises a third device configured to combine the discrete output and the one or more delayed cancellation signals to create an input to the decision feedback equalizer. The decision device may comprise a slicer having ten output levels. In one configuration, each multi-channel communication system comprises a station and each station comprises four receivers.

In at least one embodiment a receiver is provided for use in a multi-receiver system and is configured to receive two or more signals via two or more channels. In one configuration each respective receiver comprises an input configured to accept a received signal and a decision device configured to quantize a decision device input signal to one of two or more decision values, such that the decision device input signal is based on the received signal. A first filter is also part of the receiver and is configured to process the decision values to create a first filtered signal. One or more second filters are configured to process the decision values and the first filtered signal to create an outgoing cancellation signal tailored to cancel coupling on one or more other channels. Also part of this embodiment are one or more additional devices configured to receive one or more incoming cancellation signals from other receivers in the multi-receiver system and process the one or more incoming cancellation signals, the first filtered signal, and the received signal to cancel unwanted coupling in the received signal.

In one embodiment, the first filter comprises a digital filter configured to generate a feedback signal that reduces intersymbol interference. In one embodiment the decision device quantizes the decision device input signal to any one of ten values based on a comparison to predetermined thresholds. It is further contemplated that the one or more second filters comprise digital filters having two or more coefficients and the one or more second filters and the first filter are configured to cancel coupling and reduce intersymbol interference. The receiver may further comprise a third filter comprising a feed forward filter that is configured to process the received signal to reduce intersymbol interference.

Also disclosed is a method for reducing interference in a multi-channel communication system having two or more receivers and two or more channels. In one embodiment the method comprises receiving a first signal on a first channel with a first receiver and a second signal on a second channel with a second receiver and then combining a feedback signal with the first received signal to create a first combined signal. Next, processing the first combined signal to reduce intersymbol interference in the first combined signal to create a processed signal wherein the interference was created by passage of the first signal through the first channel. Next, the method combines the processed signal with at least a first cancellation signal received from at least the second receiver to create a feedback signal. Thereafter, the method combines the feedback signal with the first combined signal to create a second combined signal and then processes the second combined signal to generate at least a second cancellation signal.

In one embodiment the step of combining a feedback signal with the first received signal cancels FEXT coupling in the first received signal. In one embodiment, the step of processing the first combined signal comprises performing decision feedback equalization on the signal to generate a signal that reduces intersymbol interference. Processing the second combined signal to generate at least a second cancellation signal may comprise filtering the second combined to isolate ELFEXT coupling. In one configuration, the second receiver is configured similarly to the first receiver and the second receiver generates the first cancellation signal and receives the second cancellation signal from the first receiver. In addition, the method may further comprise delaying the first cancellation signal to achieve proper timing.

A receiver configuration is also disclosed for FEXT cancellation in a multi-channel communication system comprising a feedback loop that comprises a first device configured to combine a received signal with a feedback signal and one or more incoming cancellation signals to create a combined signal. Part of this embodiment is also a decision device configured to process the combined signal to generate a decision output and a first filter. The first filter is configured to generate the feedback signal based on the decision output and the one or more incoming cancellation signals or a delayed version of the one or more incoming cancellation signals, wherein the one or more incoming cancellation signals are received from one or more other receivers in the multi-channel communication system. Also part of this embodiment is one or more second filters configured to receive at least the decision output and generate one or more outgoing cancellation signals that are then routed to other receivers in the multi-channel communication system.

In one embodiment, the first device comprises a subtractor or summing junction, the first type filter is configured to account for the effects of the channel, and the one or more second type filters are configured to account for coupling. In one embodiment FEXT cancellation is performed by the first filter and an incoming cancellation signal. In one embodiment, the receiver further comprises a feed-forward filter configured to process the received signal prior to the received signal arriving at the feedback loop. In one configuration, the receiver is associated with each channel in a four-channel communication system and each receiver receives an incoming cancellation signal from each of the other receivers.

Also disclosed herein is a method for canceling coupling in a multi-channel communication system having two or more receivers comprising the steps of receiving a signal over a channel and also receiving at least one cancellation signal from at least one of the other receivers in the multi-channel communication system. The method then processes the signal to account for the effect of the signal passing through the channel thereby generating a processed signal and combining the processed signal and the one or more cancellation signals from the other receivers to generate a feedback signal. Thereafter, combining the feedback signal with the received signal to cancel coupling in the received signal and then generating one or more outgoing cancellation signals. The method then provides at least one outgoing cancellation signal to at least one of the other receivers in the multi-channel communication system.

This method may also include generating one or more outgoing cancellation signals by generating one or more cancellation signals with a filter configured to isolate the ELFEXT coupling. In one embodiment, the method further comprises combining the feedback signal with the one or more cancellation signals from the other receivers prior to combining the feedback signal with the received signal to reduce noise in the received signal. The processing may further comprise quantizing the combination of the received signal and the one or more cancellation signals to one of one or more discrete levels prior to processing.

Also disclosed herein is a method and apparatus to perform processing at the transmitter to thereby pre-cancel or precode unwanted coupling that will couple onto the transmitted signal during passage of the signal through the channel. In one embodiment a transmit system is configured as part of a first station such that the first station has two or more transmitters each of which are associated with a channel. The transmitters are configured as part of a multi-channel communication system that is configured to modify a data signal prior to transmission by the transmitter from the first station to a second station to reduce the effects of coupling on the data signal. In one embodiment at least one of the transmitters in the transmit system comprises an input configured to receive a data signal, the data signal to be transmitted over a first channel after processing by the transmitter. Also part of this system is one or more filters configured to generate one or more outgoing cancellation signals, the one or more outgoing cancellation signals to be provided to one or more other transmitters in the transmit system to cancel, prior to transmission of the data signal, FEXT coupling from the first channel to one or more other channels. A device is also provided as part of this embodiment that is configured to combine one or more incoming cancellation signals from the one or more other transmitters within the transmit system with the signal so that the one or more incoming cancellation signals arriving from the one or more other transmitters in the multi-channel communication system are configured to cancel, prior to transmission of the data signal, FEXT coupling, that will couple, from the one or more other channels to the first channel.

In one embodiment, the device comprises a subtractor configured to subtract the one or more incoming cancellation signals from the data signal. In one embodiment, the one or more filters comprise digital precode FEXT filters. For example in one embodiment the digital precode FEXT filter is associated with each of the other transmitters in the transmit system and each digital precode FEXT filter is configured to generate an incoming cancellation signal. It is also contemplated that the transmitter may further comprise a transmit precode filter in addition to the one or more filters configured to generate one or more outgoing cancellation signals.

Also disclosed is a coupling precode filter system configured to modify two or more signals in a multi-transmitter, multi-channel transmit system to cancel, prior to transmission, FEXT coupling that may occur during transmission of the two or more signals through the two or more channels. In one embodiment, this system comprises a first input configured to receive a first signal and a second input configured to receive a second signal. A first filter is also provided and is configured to process the first signal to generate a first cancellation signal so that the first cancellation signal cancels at least a portion of the coupling that will couple from the first signal onto the second signal during transmission. A second filter is also provided and is configured to process the second signal to generate a second cancellation signal so that the second cancellation signal cancels at least a portion of the coupling that will couple from the second signal onto the first signal during transmission. Also part of this system is a first device, configured to combine the second cancellation signal with the first signal prior to transmission of the first signal, and a second device configured to combine the first cancellation signal with the second signal prior to transmission of the second signal.

In one variation of this embodiment the first filter and second filter are configured as non-causal filters. In one embodiment the first filter is located in a first transmitter and the second filter is located in a second transmitter and each of the first transmitter and the second transmitter further comprise a transmit precode filter. It is contemplated that the coupling precode filter system may be configured to operate in a four-channel environment and thereby further comprises a third filter and a fourth filter.

Also disclosed herein is a method, for use in a multi-channel communication system having two or more transmitters, for FEXT cancellation of coupling from a first signal transmitted on a first channel to a second signal transmitted on a second channel. Such a method may comprise receiving a first signal at a first transmitter and then performing first processing on the first signal to create a first processed signal. The method also routes the first processed signal to one or more first transmitter cancellation filters and performs second processing on the first processed signal with the one or more first transmitter cancellation filters to create a cancellation signal. Thereafter, routing the cancellation signal to a second transmitter and combining, prior to transmission, the cancellation signal with a second signal being processed by a second transmitter to reduce the effects of coupling of the first signal onto the second signal during transmission.

In this configuration, the precode FEXT filter is configured as a non-causal filter. In addition, the multi-channel communication system may comprise at least one station having four transmitters, each of which is associated with a channel. Moreover, the method may further comprise receiving a second cancellation signal at the first transmitter and combining the second cancellation signal with the first processed signal to reduce the effects of coupling from the second signal onto the first processed signal during transmission. For example, the combining may comprise subtracting the cancellation signal from the second signal.

Also disclosed is a method of FEXT cancellation in a four-channel communication system, wherein a transmitter is associated with each of the first channel, second channel, third channel, and fourth channel. In one embodiment the method may comprise receiving a first signal, second signal, third signal, and fourth signal at each of a first transmitter, second transmitter, third transmitter, and fourth transmitter respectively and processing the first signal to generate a second transmitter cancellation signal, a third transmitter cancellation signal, and a fourth transmitter cancellation signal. The method also comprises routing the second transmitter cancellation signal, the third transmitter cancellation signal, and a fourth transmitter cancellation signal to the second transmitter, third transmitter, and fourth transmitter respectively and then combining the second transmitter cancellation signal, the third transmitter cancellation signal, and the fourth transmitter cancellation signal with the second signal, third signal, and fourth signal respectively. The step of combining cancels the effects of FEXT coupling onto the second channel, third channel, and fourth channel that will occur during transmission of a signal on the first channel.

In one embodiment of this method the step of processing the first signal comprises routing the first signal to a first precode FEXT filter, a second precode FEXT filter, and third precode FEXT filter and then processing the first signal in each of the precode FEXT filters to create the second transmitter cancellation signal, the third transmitter cancellation signal, and the fourth transmitter cancellation signal. This method may further comprise receiving at the first transmitter one or more incoming cancellations signals from each of the second, third and fourth transmitters in the four channel communication system and then combining the one or more incoming cancellations signals from each of the other transmitters with the first signal to cancel the effects of FEXT coupling on the first signal. In one variation the method further comprises performing transmit precode filtering on the first signal and the processing is performed by one or more digital filters. It is contemplated that the transfer function of the one or more digital filters may be selected to cancel ELFEXT.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIGS. 10A-10C illustrate a block diagram of an example embodiment of a transmitter configured in a multi-channel configuration.

DETAILED DESCRIPTION

Figure 1:
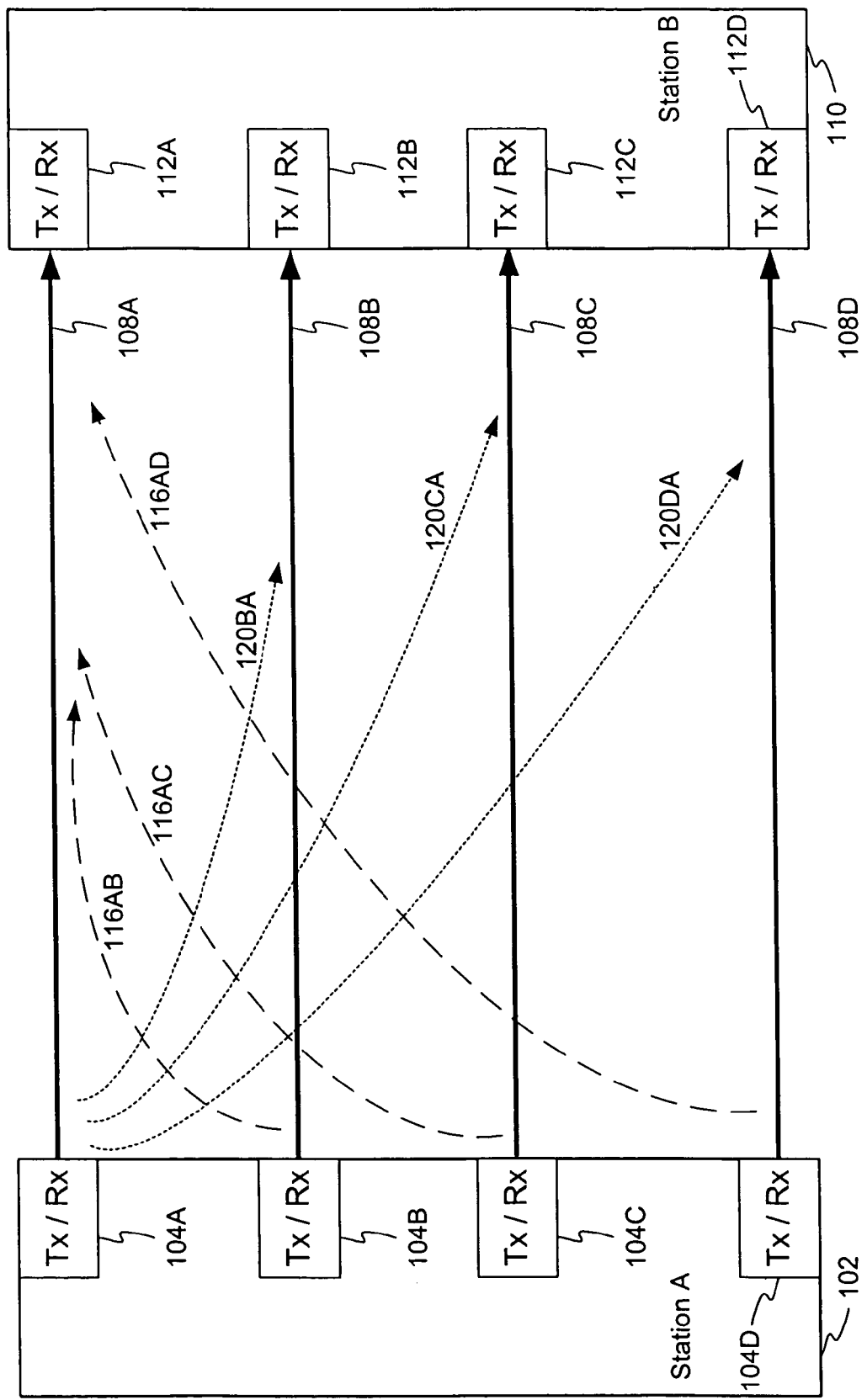
FIG. 1 illustrates a block diagram of an example embodiment of a two station communication system.
Figure 2:
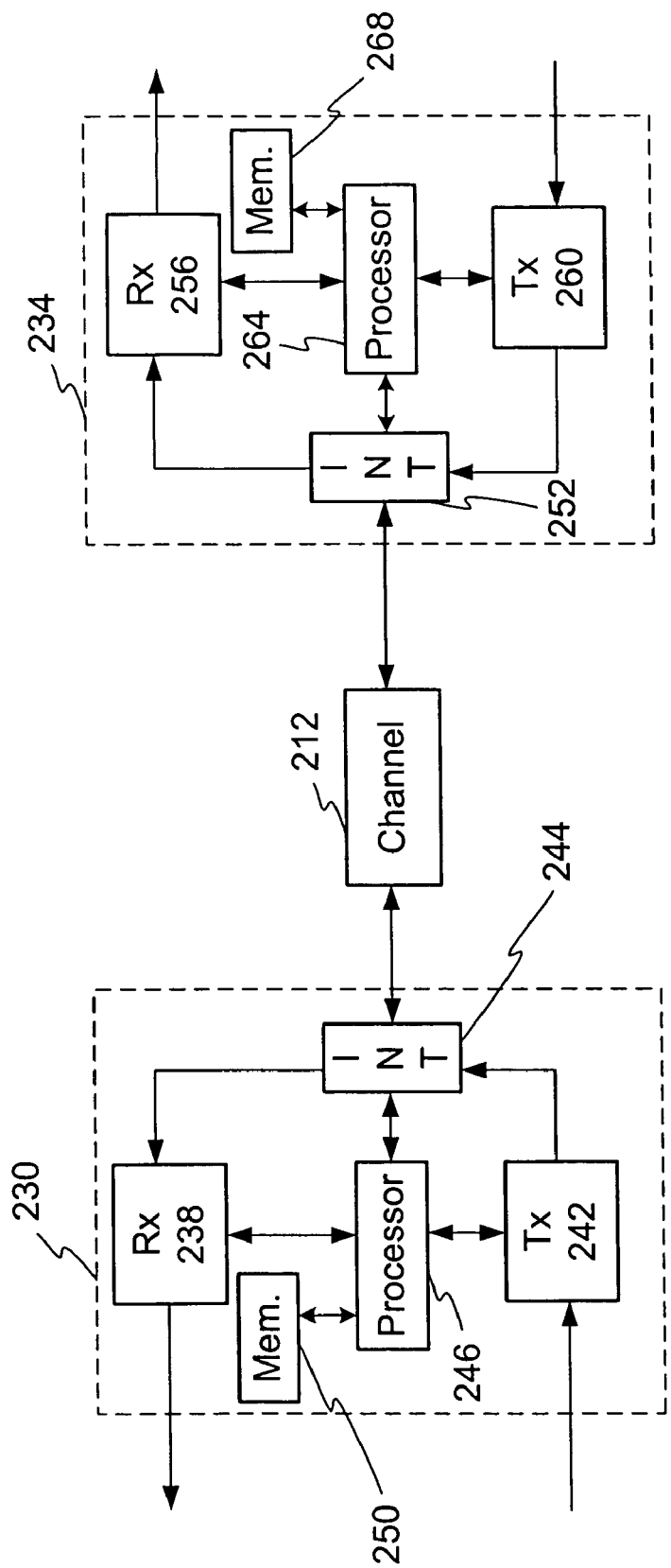
FIG. 2 illustrates a block diagram of a receiver/transmitter pair.

In reference to FIG. 2, a block diagram of a receiver/transmitter pair is shown. A channel 212 connects a first transceiver 230 to a second transceiver 234. The first transceiver 230 connects to the channel 212 via an interface 244. The interface 244 is configured to isolate the incoming and outgoing signals. The channel 212 may comprise more than one conductor, and hence the interface 244 may perform isolation for each channel based on direction of data flow. The receive module 238 and transmit module 242 may comprise any assembly of hardware, software, or both configured to operate in accordance with the principles described herein.

The receive module 238 and transmit module 242 communicate with a processor 246. The processor 246 may include or communicate with a memory 250. The processor operates as described below in more detail and as would be understood by one of ordinary skill in the art. The memory 250 may comprise one or more of the following types of memory: RAM, ROM, hard disk drive, flash memory, or EPROM. The processor 246 may be configured to perform one or more calculations or signal analysis. In one embodiment, the processor 246 is configured to execute machine readable code stored on the memory 250. The processor 246 may perform additional signal processing tasks as described below.

The second transceiver 234 is configured similarly to the first transceiver 230. The second transceiver 234 comprises an interface 252 connected to a receiver module 256 and a transmitter module 260. The receiver module 256 and a transmitter module 260 communicate with a processor 264, which in turn connects to a memory 268. Operation occurs as described below in more detail.

Figure 3:
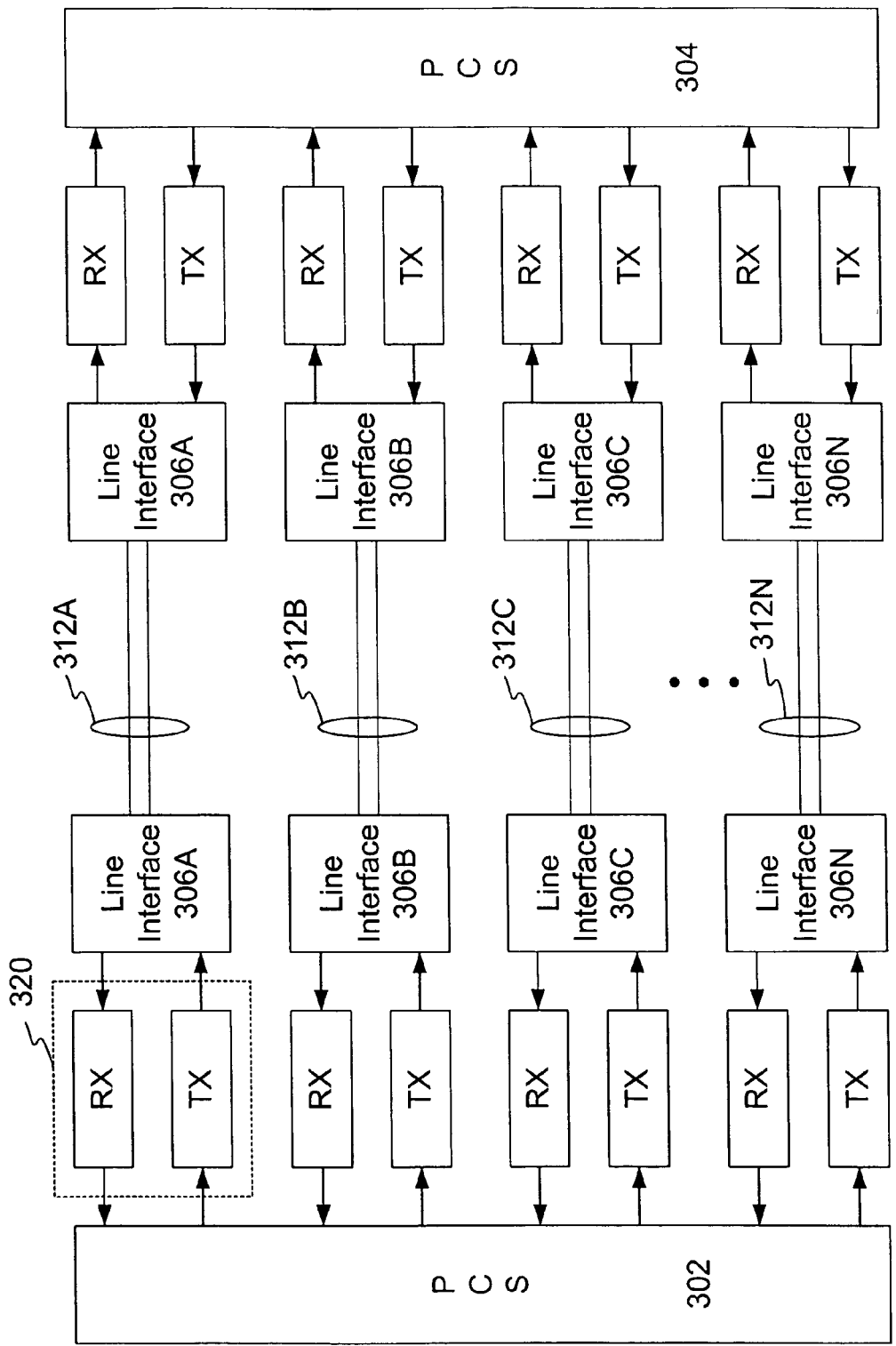
FIG. 3 illustrates a block diagram of an example embodiment of a multi-channel point-to-point communication system.

FIG. 3 illustrates a block diagram of an exemplary multi-channel point-to-point communication system. One exemplary application of such a multi-channel communication system is a multi-gigabit transceiver utilizing any category or class of unshielded twisted pair (UTP) cable supporting Ethernet protocols. As shown, it includes a physical coding sublayer (PCS) 302, 304 shown as coupled together over a channel 312. In one embodiment, each channel comprises twisted pair conductors. Each of the channels 312 is coupled between transceiver blocks 320 through a line interface 306, and each channel is configured to communicate information between transmitter/receiver circuits (transceivers) and the physical coding sublayer (PCS) blocks 302, 304. Although shown with four channels for purposes of discussion, any number of channels and associated circuitry may be provided. In one embodiment, the transceivers 320 are capable of full-duplex bi-directional operation. In one embodiment, the transceivers 320 operate at an effective rate of about 2.5 Gigabits per second.

Figure 4:
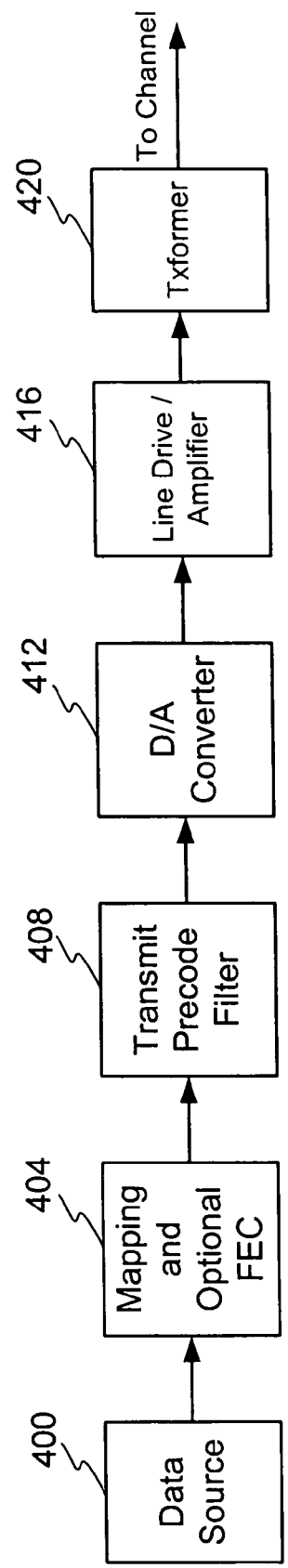
FIG. 4 illustrates a block diagram of an example embodiment of a transmitter.

FIG. 4 illustrates a block diagram of an example embodiment of a transmitter. This is but one exemplary embodiment of a transmitter. It is contemplated that other configurations may be embodied by one of ordinary skill in the art. In the exemplary configuration of FIG. 4, a data source 400 connects to a mapping module 404, which in turn connects to a transmit precode filter 408. It is contemplated that the transmit precode filter 408 does not deal with FEXT cancellation. FEXT cancellation using a FEXT precode filter (not shown in FIG. 4) that is in addition to or supplemental to the transmit precode filter 408 is discussed below in more detail.

The data source 400 may comprise any source of data to be transmitted over a channel. In one embodiment, the data source 400 comprises a processing or networking layer of a communication protocol. In one embodiment, the data source 400 comprises a network processing device, for example, a media access controller (MAC). In one embodiment, the data arrives from application software executing on a computer.

The mapping module 404 comprises hardware, software, or a combination of both configured to transform the received binary data into one or more symbols capable of representing one or more bits of binary data. One example mapping that may occur is pulse amplitude modulation (PAM), wherein several bits of binary data are mapped into a single symbol. Another example mapping comprises quadrature amplitude modulation (QAM). Any type mapping may be utilized. Through mapping, transmission of a single symbol achieves transmission of several bits of information thereby increasing data transfer rates.

In addition to mapping, the mapping module 404 may incorporate forward error correction (FEC) coding. Examples of FEC coding comprise convolutional coding and trellis coding. It is contemplated that the method and apparatus described herein may be utilized with any form of error correction, or without error correction.

The transmit precode filter 408, which is discussed below in greater detail, connects to the output of the mapping module 404 and comprises a signal modification device configured to manipulate the signal to counter the distorting effects of the channel. The transmit precode filter 408 may be configured as a digital filter having coefficient values set to achieve a desired level of signal modification. In one embodiment, the transmit precode filter 408 comprises a finite impulse response filter adapted to at least partially negate the distorting effects of a channel.

The output of the transmit precode filter 408 connects to a digital to analog (D/A) converter 412 to transform the mapped signal to an analog format suitable for transmission through a channel. Thereafter, the signal is provided to a line driver/amplifier 416. The line driver/amplifier 416 manipulates the signal to a power level suitable for transmission over the channel. The degree or level of amplification may be dependant upon the power limits or specification as defined by a particular communication protocol, crosstalk and coupling concerns, and the distance to a receiver or a repeater. The output of the line driver/amplifier 416 connects to a transformer/hybrid 420. The transformer/hybrid 420 provides isolation between transmit and receive signals as well as the channel itself. The output of the transformer/hybrid 420 connects to a channel.

Prior to discussion of further embodiments, additional discussion of far end crosstalk (FEXT) is warranted. In general, FEXT is defined as far end cross talk, and as such it is composed of, i.e., is the convolution of, the channel response and the ELFEXT response. ELFEXT comprises the equivalent coupling at the far end of the channel measured with respect to an attenuated transmit signal. It is contemplated that the channel response can be that of the disturber channel or the victim channel. Removing FEXT is made difficult because FEXT is dependant on the length of the channel and since the FEXT signal may couple at the far end of the channel, the near end of the channel or anywhere in between. As a result, the FEXT is also subject to ISI and attenuation as it passes through the victim channel. Considering FEXT as ELFEXT takes into consideration the effects of the channel, including the length and effects of the channel. Prior art solutions did not adequately address such aspects. Through consideration of this and other aspects, a more complete coupling cancellation system and method may be realized.

Figure 5:
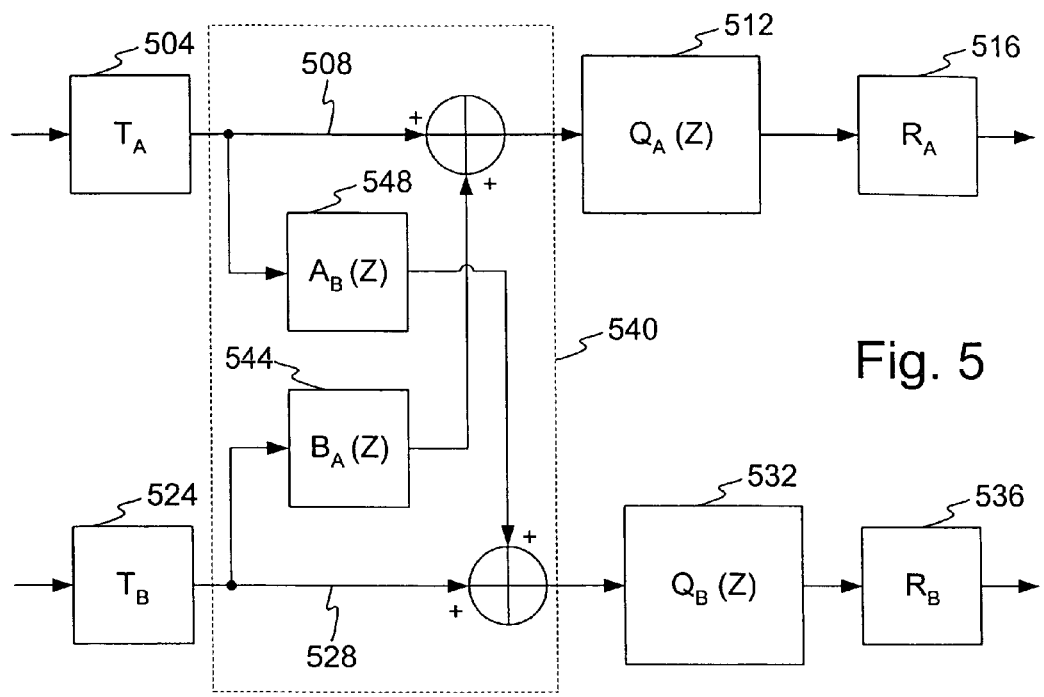
FIG. 5 illustrates a block diagram of a FEXT model wherein FEXT that couples from a disturber channel onto a victim channel passes through the victim channel.

FIG. 5 illustrates a block diagram of an equivalent model of coupling occurring prior to passage of the coupling through the channel. This is but one possible system model. It is contemplated that other system model configurations may be utilized without departing from the scope of the invention. As shown, a channel A transmitter 504 connects to a channel A 508 having a transfer function or impulse response shown by $Q_A(Z)$ in block 512. Channel A 508 connects to a channel B receiver 516.

Similarly, a channel B transmitter 524 connects to a channel B 528 having a transfer function shown by $Q_B(Z)$ in block 532. Channel B 528 connects to a channel B receiver 536. Also included in FIG. 5 is the coupling effect between channels shown within dashed line 540. The signal on channel B 528 couples into channel A 508. The transfer function of the coupling is defined by block 544 as $B_A(Z)$. Likewise, block 548 defines the coupling from channel A into channel B as $A_B(Z)$.

As can be seen, the coupling in this example embodiment is shown as occurring before the effects of the channel 512, 532. Thus, the FEXT signal that couples from channel A to channel B is considered to be affected by the transfer function of the channel $Q_B(z)$ as it passes through channel B. Thus, the transfer function for the FEXT coupling from channel A to channel B can be described as the ELFEXT component $A_B(Z)$ convolved with the transfer function of channel B $Q_B(Z)$.

Figure 6:
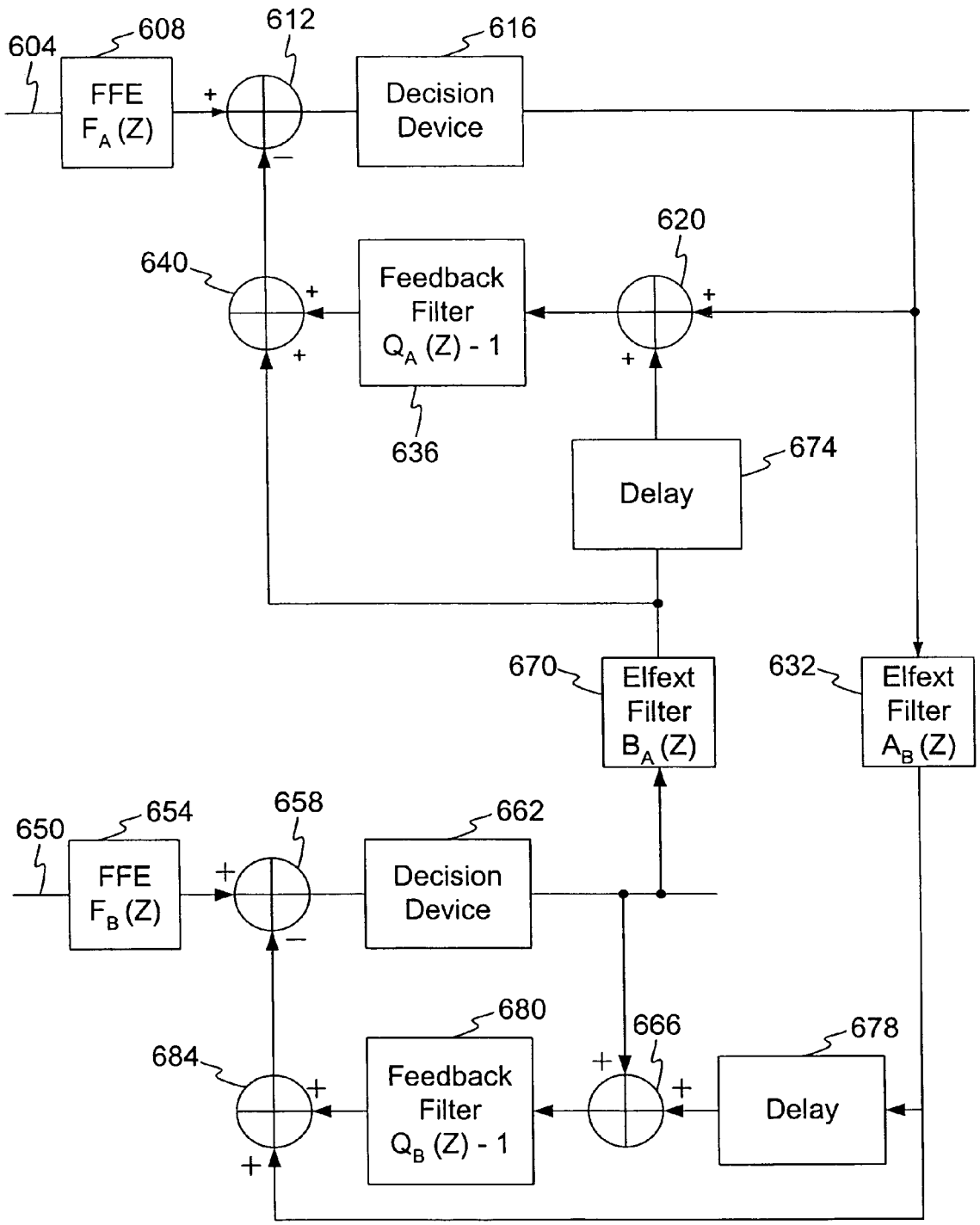
FIG. 6 illustrates a block diagram of an example embodiment of a receiver configured based on the invention described herein.

FIG. 6 illustrates a block diagram of an example embodiment of a FEXT cancellation system based on a model of FEXT coupling prior to passage through the victim channel as shown in FIG. 5. In general, the system of FIG. 6 operates to cancel FEXT on a victim channel utilizing the signals received on the other channels. As an advantage of the embodiment shown in FIG. 6, the processing benefits gained by a receiver's other filters, such as for example, the FFE and DFE filters, are utilized when generating the FEXT cancellation signal. As a result, the complexity of the apparatus that generates the FEXT cancellation signal may be made less complex since part of the processing burden is performed by other filter apparatus.

Turning now to FIG. 6, a channel A 604 connects to a feed forward filter (FFE) 608 having transfer function $F_A(Z)$. In one embodiment, the FFE 608 is configured to reduce intersymbol interference. It is contemplated that one of ordinary skill in the art is capable of FFE 608 construction and is familiar with basic FFE operation. Accordingly, the basic principles of FFE operation are not discussed in detail herein beyond that associated with the new and distinctive features of the invention. It is further contemplated that filter or equalizer structures other than an FFE 608 may be utilized without departing from the scope of the invention.

The output of the FFE 608 connects to a subtractor 612, and the output of the subtractor connects to a decision device 616. The decision device 616 is a device that quantizes an input to one of two or more possible values based on analysis of the input to one or more threshold values. In one embodiment, the decision device 616 operates in conjunction with PAM10 mapping to quantize the input s(n) to one of ten values. In one embodiment, the decision device 616 analyzes the received signal's voltage level, after processing, to determine the symbol sent over the channel. The output of the decision device 616 may comprise any number of discrete levels. As shown, the output of the decision device 616 is fed back into an adder 620 and into an ELFEXT filter 632. The output of the adder 620 is provided to a feedback filter 636 (DFE) having a transfer function of $Q_A(Z)-1$. It is contemplated that one of ordinary skill in the art is capable of DFE 636 construction and is familiar with basic DFE operation. Accordingly, the basic principles of DFE operation are not discussed in detail herein beyond that associated with the new and distinctive features of the invention. It is further contemplated that filter or equalizer structures other than an FFE 608 or DFE 636 may be utilized without departing from the scope of the invention. Although not shown, it is also contemplated that one or more delays may be utilized as necessary and as would be understood by one of ordinary skill in the art.

The terms adder, subtractor, summing junction or the like should be interpreted broadly to mean any device configured to combine signals. As can be appreciated by one of ordinary skill in the art, subtraction is the equivalent of adding a negative value.

The FFE 608 and the DFE 636 perform equalization on the received signal to compensate for the distorting effects of the channel. The DFE 636, as part of the feedback, receives and weights past values, which are subsequently added in the summing junction 640, then subtracted in element 612. It is contemplated that the FFE 608 and DFE 636 may possess coefficients, or other scaling values, associated with one or more taps or stages of the FFE and the DFE. The coefficient values are selected to achieve desired signal equalization to thereby negate, reverse, or reduce the effects of the channel. In one embodiment, the FFE 608 and DFE 636 coefficient values are selected based on the principles described herein. In one embodiment, the coefficient values are arrived at using a least mean squared algorithm. In one embodiment, the coefficient values of the FFE 608 and DFE 636 are calculated and selected to counter the signal distorting effects of the channel while minimizing noise amplification and minimizing the undesirable effects of error propagation through the DFE feedback loop.

The ELFEXT filter 632 comprises a filter configured to estimate the ELFEXT transfer function to thereby account for the ELFEXT. Stated another way, the ELFEXT filter 632 has a transfer function $A_B(Z)$ that mirrors the transfer function of the coupling from one channel to another. The ELFEXT filter 632 may comprise any processing system or device configured to generate a cancellation signal. In this embodiment and as suggested by the model in FIG. 5, the coupling function of the ELFEXT filter is prior to passage of the coupling through the channel.

The output of the adder 620 is provided to a feedback filter 636 shown as having a transfer function of $Q_A(Z)-1$. In one embodiment, the feedback filter 636 is configured to be an estimate of the transfer function of the channel. The feedback filter output is provided to an adder 640 which combines the feedback filter output with a cancellation signal from one or more other channels. In this embodiment, the cancellation signal is received from a channel B cancellation system, which is discussed below in more detail. The output of the adder 640 is provided to subtractor 612, where the cancellation signal is subtracted from the received signal. Since the cancellation signal is subtracted prior to the decision device 616, the decision by the decision device has a higher likelihood of being correct. This improves system performance and accuracy.

The apparatus of channel B is now discussed. Channel B 650 connects to a feed forward filter 654, the output of which connects to a subtractor 658. The output of the subtractor 658 feeds into a decision device 662. The decision device has an output that feeds into an adder 666 and an ELFEXT filter 670. The ELFEXT filter 670 has a transfer function $B_A(z)$ and an output that connects to the adder 640, which is discussed above, and into a delay 674. The summing junction 666 also receives an input from a delay 678. The delay 678 receives an input from the ELFEXT filter 632. The delays 674, 678 account for propagation delay differences in $Q_A(Z)$ and $Q_B(z)$ and/or to account for processing delay.

The output of summing junction 666 connects to a feedback filter 680 which has a transfer function defined as $Q_B(Z)-1$. The output of the feedback filter 680 is provided to an adder 684, which also receives as an input the output of the ELFEXT filter 632. The adder 684 produces the cancellation signal which is subtracted from the signal received on channel B in subtractor 658.

The following discussion details operation of the cancellation of the signal received on a victim channel, in this example discussion channel A, from a disturber channel, in this example discussion channel B. It is contemplated that the principles shown and discussed herein may be extended to any number of channels. The system shown in FIG. 6 receives a signal on channel A 604 and on channel B 650. Both signals are processed in a generally similar manner by the FFE 608, 654, the decision device 616, 662, and the feedback filter 636, 680. Of importance, the output of decision device 662 is provided to the ELFEXT filter 670 for processing. The output of decision device 662 is assumed to be an accurate decision of the actual signal sent from transmitter B. The ELFEXT filter 670 is configured or trained to have a transfer function $B_A(Z)$ representing the coupling from channel B to channel A, but it does not represent the effect or transfer function of channel A. The output of the ELFEXT filter is provided to the adder 640, wherein it is added with the output of the feedback filter 636. As stated above, the feedback filter is configured or trained to have a transfer function of that of the channel with which it is associated. As can be seen visually in FIG. 6, the cascading of the ELFEXT filter output and the feedback filter output results in a cancellation signal that accounts for the FEXT coupling onto channel A from channel B and for the passage of this FEXT coupling through channel A. The delays are provided to account for different propagation delay characteristics in $Q_A(Z)$ and $Q_B(Z)$ or a signal processing path associated therewith.

As an advantage to this embodiment, the processing complexity of this operation is distributed between the filters 636, 670 for channel A and filters 680, 632 for channel B. As a result, the complexity of each filter is reduced. Furthermore, the feedback filter is already a component in many signal processing systems, and by utilizing its already available output, the process of FEXT cancellation may be realized with minimal additional processing requirements. If a single filter is tasked with generating the FEXT cancellation signal, such a single filter would be undesirably complex.

Figure 7:
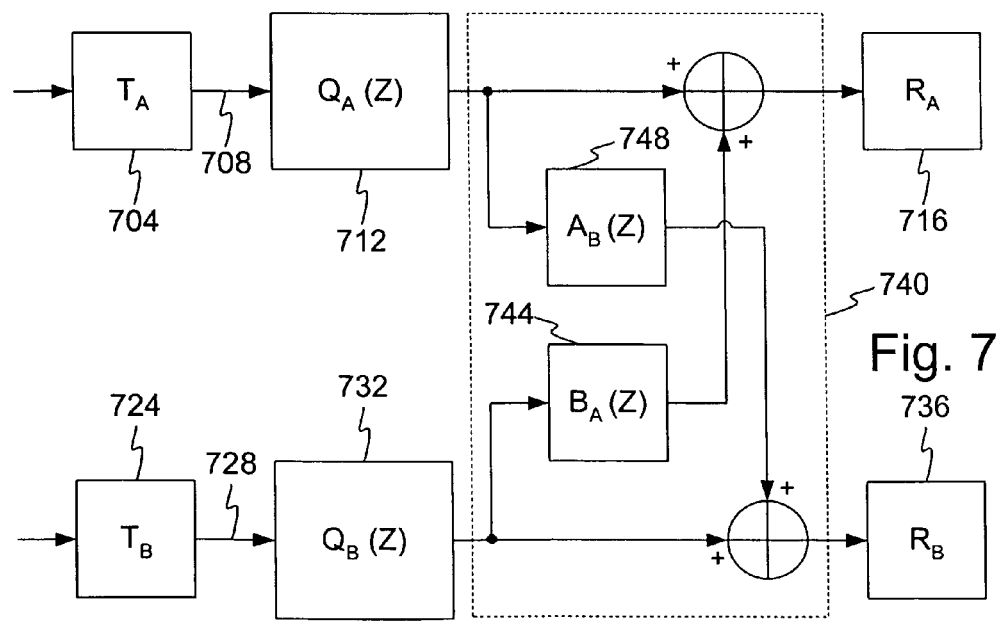
FIG. 7 illustrates a block diagram of a FEXT model wherein FEXT that couples from a disturber channel onto a victim channel passes through the disturber channel prior to coupling.

FIG. 7 illustrates a block diagram of an equivalent model of FEXT coupling occurring after passage of the disturber signal through the disturber channel. As shown, a channel A transmitter 704 connects to a channel A 708 having a transfer function or impulse response shown by $Q_A(Z)$ in block 712. Channel A 708 connects to a channel A receiver 716.

Similarly, a channel B transmitter 724 connects to a channel B 728 having a transfer function or impulse response shown by $Q_B(Z)$ in block 732. Channel B 728 connects to a channel B receiver 736. Also included in FIG. 7 is the coupling effect between channels shown within dashed line 740. The signal on channel B 728 couples into channel A 708. The impulse response or transfer function of the coupling is defined by block 744 as $B_A(Z)$. Likewise, block 748 defines the coupling from channel A into channel B as $A_B(Z)$.

As can be seen, the coupling in this example embodiment is shown as occurring after the effects of the channel 708, 728. Thus, the FEXT signal that couples from channel A to channel B is considered to be affected by the transfer function of the channel $Q_A(Z)$ as it passes through channel A. Thus, the transfer function for the FEXT coupling from channel A to channel B can be described as the transfer function of the ELFEXT $A_B(Z)$ convolved with the transfer function of channel B $Q_A(Z)$. This is in contrast to the model shown in FIG. 5, wherein the ELFEXT coupling from channel A onto channel B is subject to the distorting effects of passage through channel B instead of channel A.

Figure 8:
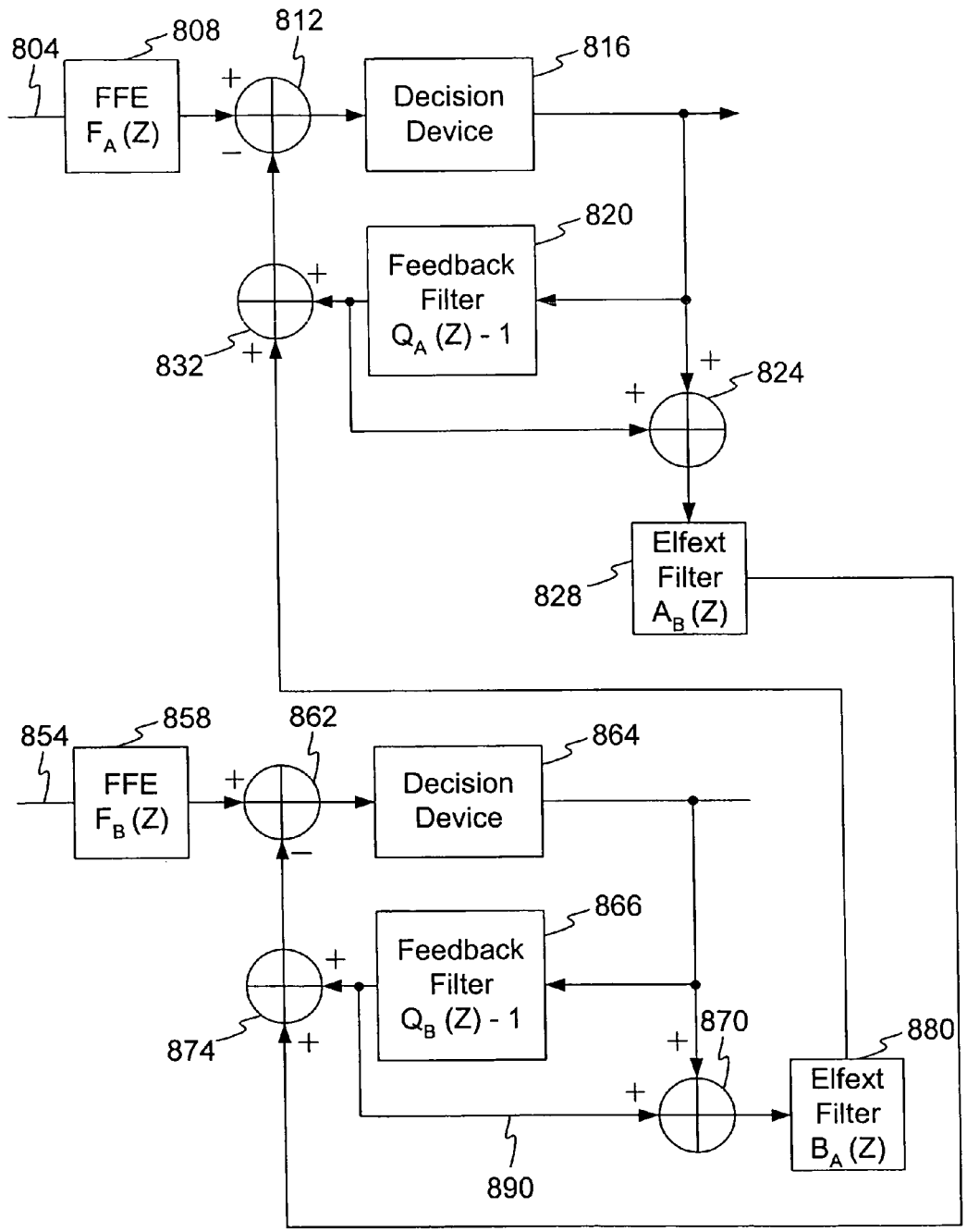
FIG. 8 illustrates a block diagram of an alternative embodiment of a receiver configured according to the present invention.

FIG. 8 illustrates a block diagram of an example embodiment of a FEXT cancellation system based on a model of FEXT coupling after passage through the disturber channel. In general, this block diagram is based on the model of FIG. 7, and as such, it is configured to cancel FEXT coupling from a disturber channel to a victim channel with the assumption that the coupling signal first passes through disturber channel prior to coupling onto the victim channel.

As shown in FIG. 8, a channel A 804 connects to a feed forward filter 808, the output of which connects to a subtractor 812. A decision device 816, such as a slicer, receives the output of the subtractor 812 and provides its output to a feedback filter 820 and an adder 824. The adder 824 also receives an input of the feedback filter 820 output. The output of the adder 824 is provided to an ELFEXT filter 828 having a transfer function of $A_B(Z)$. The ELFEXT filter 828 is configured or trained to have a transfer function $A_B(z)$ based on the ELFEXT that couples from channel A to channel B. Accordingly, the output of the ELFEXT filter 828 is a cancellation signal that is provided to channel B cancellation system which is now described.

Channel B connects to a FFE 858, which in turn connects to a subtractor 862. The output of the subtractor 862 feeds into a decision device 864, which has an output that connects to both of a feedback filter 866 and an adder 870. The adder 870 also receives as an input the output from the feedback filter 866, as does an adder 874. The output of the adder 870 feeds into an ELFEXT filter 880 having a transfer function defined as $B_A(Z)$. The output of this ELFEXT filter 880 is connected to an adder 832 that is associated with channel A. In turn, the output of adder 832 connects to subtractor 812. Similarly, the output of ELFEXT filter 828 is connected to adder 874, which in turn connects to subtractor 862.

In operation, it is contemplated that the signal received over channel A, the victim channel in this example discussion, may contain FEXT coupling from the disturber channel, in this example, channel B. To cancel this FEXT coupling and thereby improve the accuracy of the decision device 816, the signal is received on channel B 854 and processed by the FFE 858 and the feedback filter 866 to create the signal at conductor 890. Thereafter, this signal is added to the accurate decision from the decision device 864 by the adder 870 to create the input to the ELFEXT filter 880. To this point, the processing that has occurred on the signal received over channel B 854 accounts for the effects of channel B. To account for the effects of the ELFEXT, i.e., the amount of coupling and not the effects of the channel, the ELFEXT filter 880 is configured or trained to have a transfer function that will create a signal that approximates the amount of coupling from channel B to channel A. The output of the ELFEXT filter 880 thus comprises the cancellation signal that is provided to the channel A receiver via the adder 832, then to the subtractor 812 to be removed from the received signal. In this manner, FEXT coupling may be removed.

As stated above in conjunction with FIG. 6, as an advantage to this embodiment, the processing complexity of this operation for FEXT reduction in the victim channel is distributed between the filters 866, 880. As a result, the total complexity is reduced. Furthermore, the feedback filter 866 is already a component in many signal processing systems, and by utilizing its already available output, the process of FEXT cancellation may be realized with minimal additional processing requirements, namely filter 880. If a separate single filter is tasked with generating the FEXT cancellation signal, then such a single filter would be undesirably complex.

Figure 9:
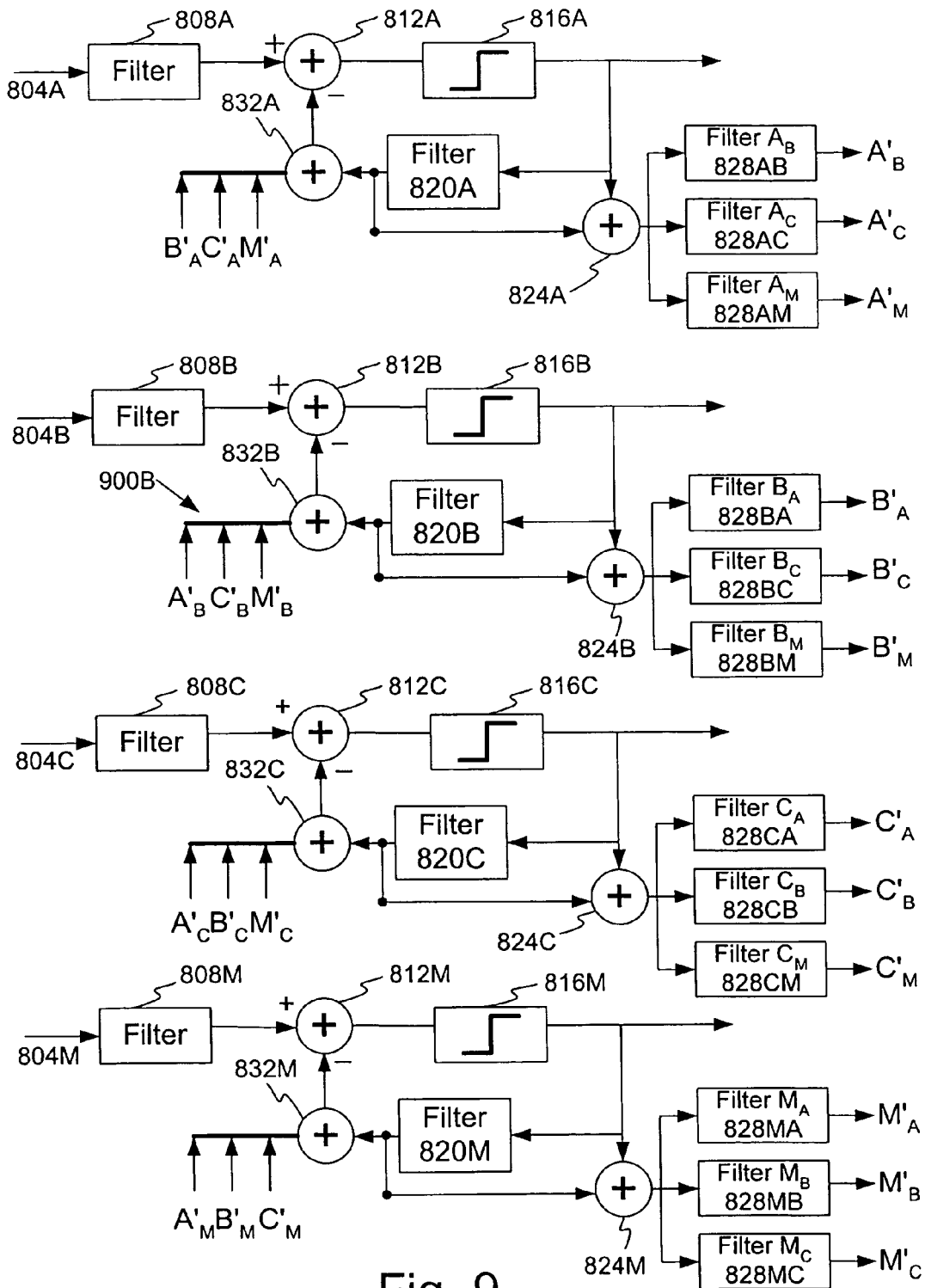
FIG. 9 illustrates a block diagram of an example embodiment of a receiver configured in a multi-channel configuration.

It should be noted that the principle described above in conjunction with FIGS. 5-8 may be extended to more than two channels. FIG. 9 illustrates a block diagram of an example embodiment of the receiver shown in FIG. 8 in a multi-channel configuration, such as channel A through channel M, where the variable M comprises any positive integer. As compared to channel A shown in FIG. 8, similar elements are labeled with similar reference numerals. As shown, input channels 804A-804M, where M is any positive integer, are received over a multi-conductor communication system having M number of channels. In one embodiment, there are more conductors than channels. The channels may comprise any medium capable of carrying a signal or data, such as but not limited to, any category or class of copper cabling, wireless channels, fiber optic channels or cables, free-space optic channels, twisted pair conductors or any other conductive path, coaxial cables or other channels that are currently or that may become available in the future. Although shown with four channels, i.e., where M equals four, it is contemplated that the principles described herein may be expanded to any number of channels or conductors.

Operation of elements 808, 816, and 820 occur as described above in conjunction with FIG. 8. Additional filters 828 are included as shown to account for the multi-channel configuration. Although not shown with connecting lines, the output of each filter 828 is routed as an input to an adder junction 832. For example, the output of filter 828AB comprises a cancellation signal $A'_B$ that comprises a cancellation signal from disturber channel A that is provided to victim channel B. Accordingly, adder 832B receives the cancellation signal $A'_B$ via input 900B and utilizes the cancellation signal $A'_B$ to remove FEXT that has coupled from channel A onto Channel B. This process occurs for each of the filters 828 and channels as shown.

It is contemplated that the filter coefficients in any of the filters discussed in FIGS. 5-9 and in particular, the coefficients of ELFEXT filter 828 in FIG. 9, may be established in any manner known in the art. Thus, the coefficients may be established during an initial training period or set at a default value during manufacture. In one embodiment, the least mean square algorithm is utilized to train or adapt the ELFEXT filters. It is further contemplated that the filter coefficients may be updated during system operation to thereby adapt to changing channel or environmental conditions. In one embodiment, training of the ELFEXT filter occurs while the filter is separate from the channel, such as when the channel is not transmitting data and the effects of ELFEXT may be isolated.

In some instances, the signals required to generate the FEXT cancellation signal do not arrive at a receiver concurrent with or prior to the arrival of the FEXT signals that are coupled onto the victim signal. For example, the signals that are required to generate the FEXT cancellation signal are the signals that are transmitted on the disturber channels, i.e., the signals on channels other than the victim channel. Hence, if a signal on a disturber channel has not arrived at its associated receiver, then that signal is not available for processing to generate a cancellation signal. This is particularly troubling when the signal coupling from the disturber channel onto the victim channel has already arrived at the receiver associated with the victim channel. Such differences in arrival times may occur because FEXT coupling may propagate through the victim channel more quickly than it propagates through the disturber channel. In addition, some channels in a multi-channel communication system are different lengths, thereby causing the signals to arrive at different times relative to a common transmit time.

As a result, some FEXT coupling may be present as a component of the signal on the victim channel even though the signal that generated the coupling, i.e., the signal on the disturber channel, has not yet arrived at the receiver associated with the disturber channel. This portion of the FEXT coupling may be referred to as the non-causal portion of the FEXT. In contrast, the causal portion of the FEXT may be defined as the FEXT components that arrive with or after the arrival of the signal that generated the FEXT on the disturber channel.

Failure to account for the different arrival rate of FEXT components, i.e., the non-causal FEXT components, may hinder operation of the FEXT cancellation system. This is especially true as data communication rates increase, since timing becomes more critical and each processing step should be completed within constrained time limits. In one embodiment, the method and apparatus disclosed herein overcomes this challenge associated with FEXT cancellation by incorporating FEXT cancellation operations in the transmitter side of the communication system.

While it is contemplated that numerous filtering or FEXT cancellation systems may be incorporated into the transmitter, in one embodiment a FEXT precode filter is tailored to perform FEXT cancellation in the transmitter. This operation may also be referred to as pre-transmission FEXT cancellation. The term precode filter as used herein is defined to mean a filter located in the transmitter. In addition, the concept of FEXT precoding occurs in addition to a possible transmit precode filter that is identified as element 408 in FIG. 4.

In general, one or more FEXT precode filters may be located in one or more of the transmitters in a multi-channel communication system and may be trained to have a transfer function that will modify a signal to thereby counter, in advance of transmission, FEXT coupling that will occur on the signal passing through the victim channel or that will couple to other channels. Use of a FEXT precode filter allows the transmitter to counter a portion or all of the FEXT coupling prior to transmission. In one embodiment, the non-causal aspects of the FEXT coupling, that is, the FEXT coupling that arrives on the victim channel after the arrival of that portion of the signal that generated the coupling, is pre-cancelled in the transmitter.

In one embodiment, precode FEXT cancellation comprises measuring the FEXT response for a channel at the receiver and dividing by the impulse response of the line to obtain the FEXT precode filter coefficients. In another embodiment, the FEXT precode filter is trained using reference based training. In yet another embodiment, the filter coefficients are derived by training the filters associated with only one channel at a time.

In one embodiment, all or a portion of the FEXT cancellation is performed by a FEXT precode filter such that the FEXT precode filter isolates the FEXT transfer function for each of the other channels in a multi-channel communication system and provides its output to each of the other transmitters. The precode FEXT cancellation signal, which is generated by the FEXT precode filter, is combined with the signals being transmitted on the other channels prior to transmission. Alternatively, the transmitted signal may be modified utilizing an inline precode FEXT filter. This may occur for each transmitter in a multi-channel communication system. The coefficients for the FEXT precode filter may be established by processing that occurs in the transmitter or processing that occurs in the receiver.

Figure 10B:
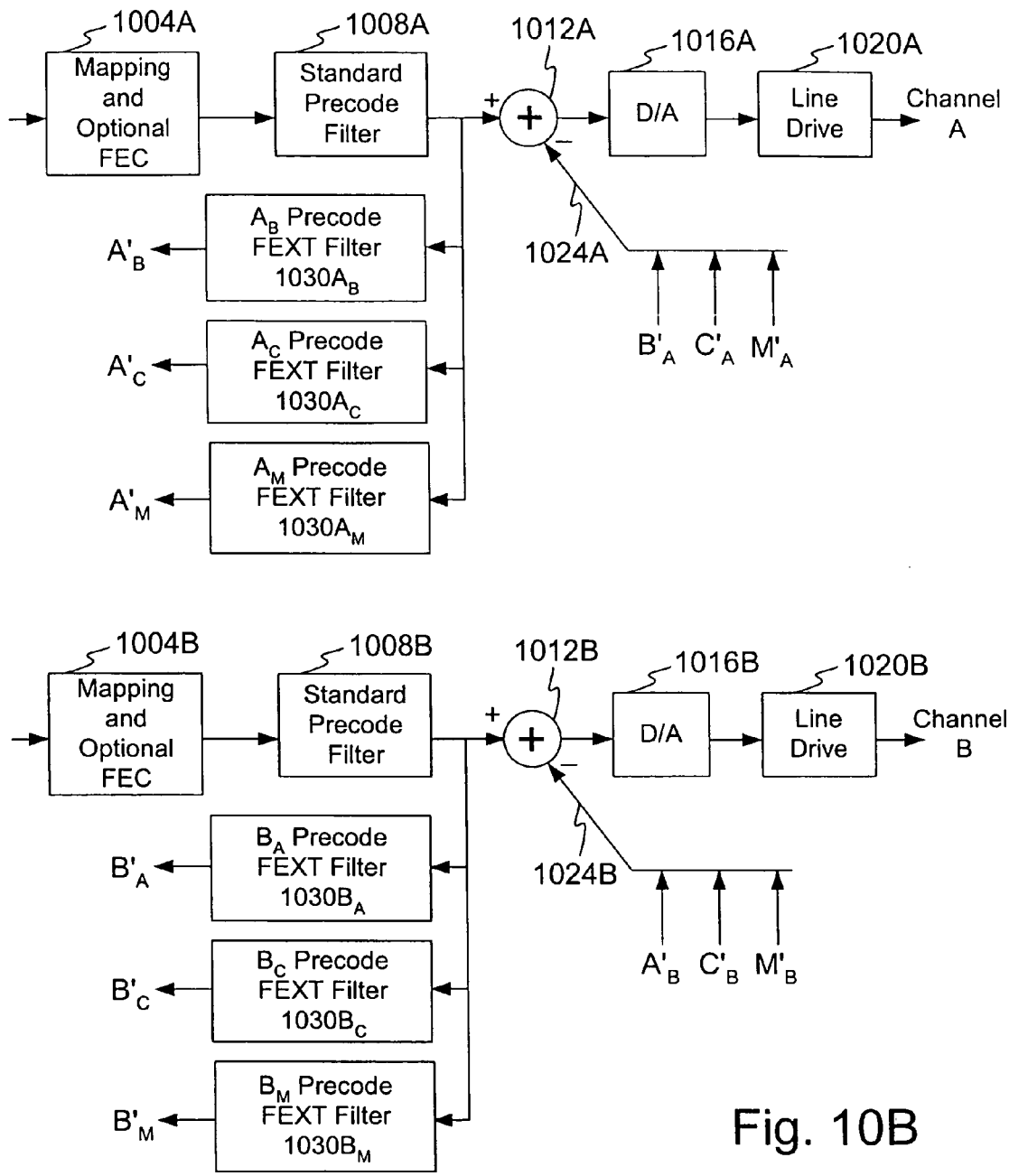
Figure 10C:
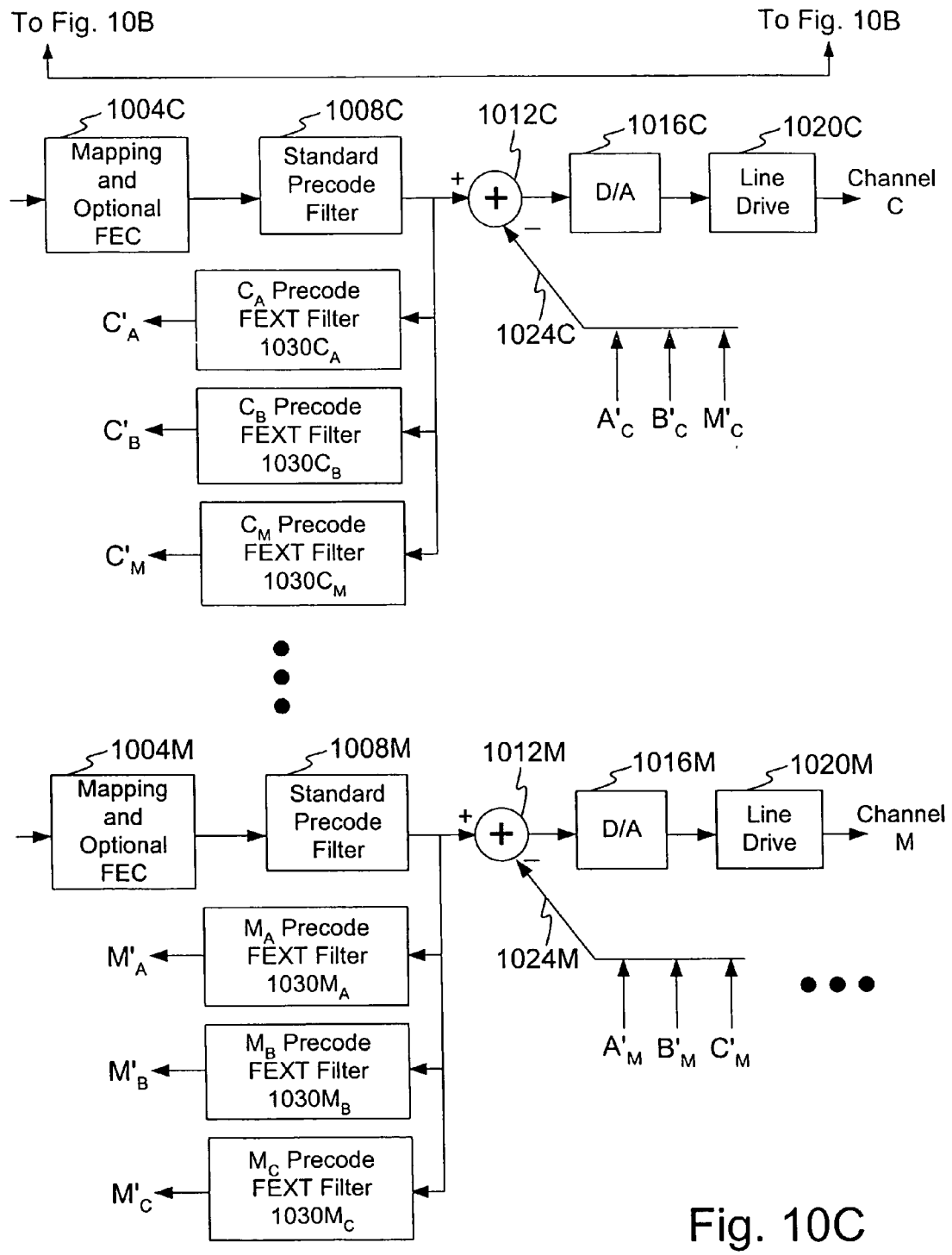
Figure 11A:
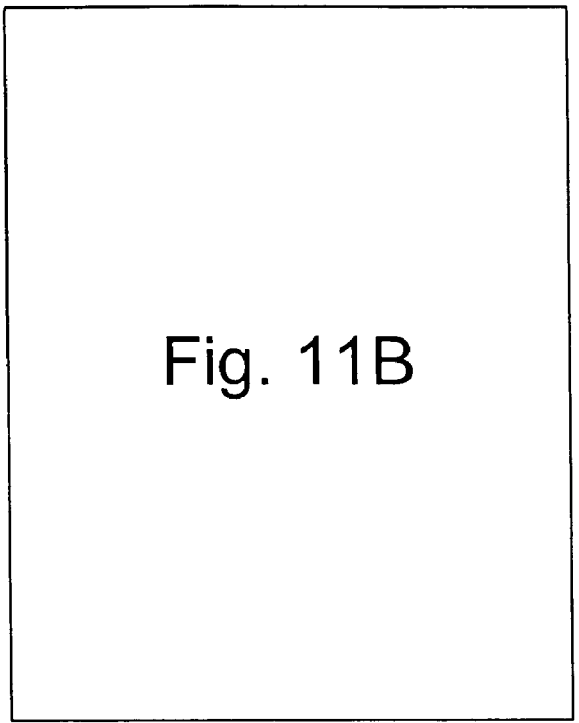
FIGS. 11A-11C illustrate a block diagram of an alternative example embodiment of a transmitter configured in a multi-channel configuration.
Figure 11A:
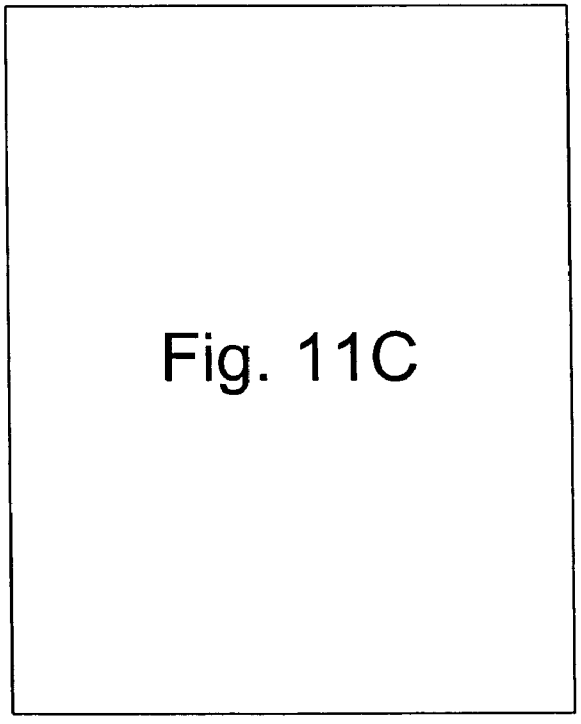
Figure 11B:
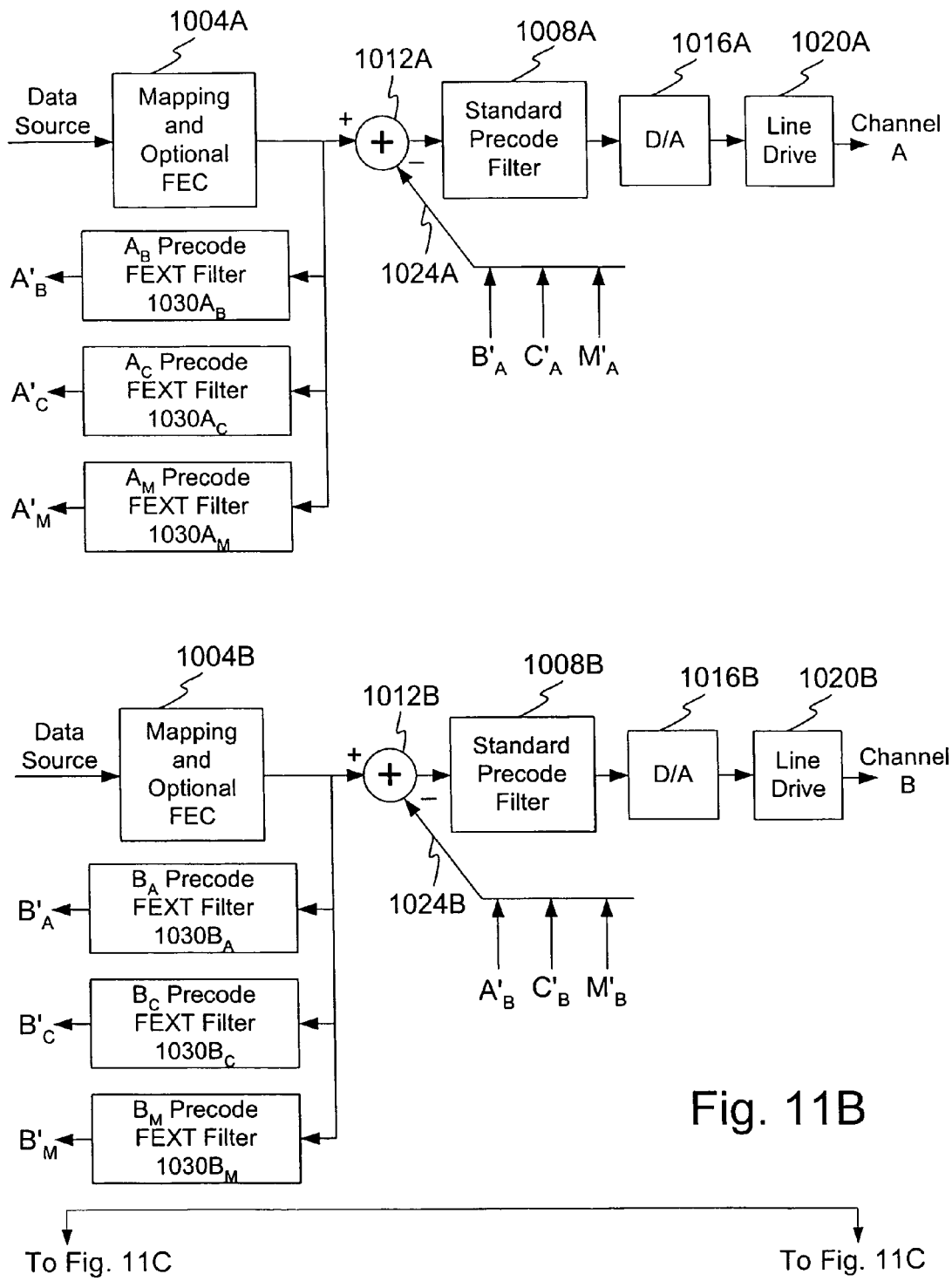
Figure 11C:
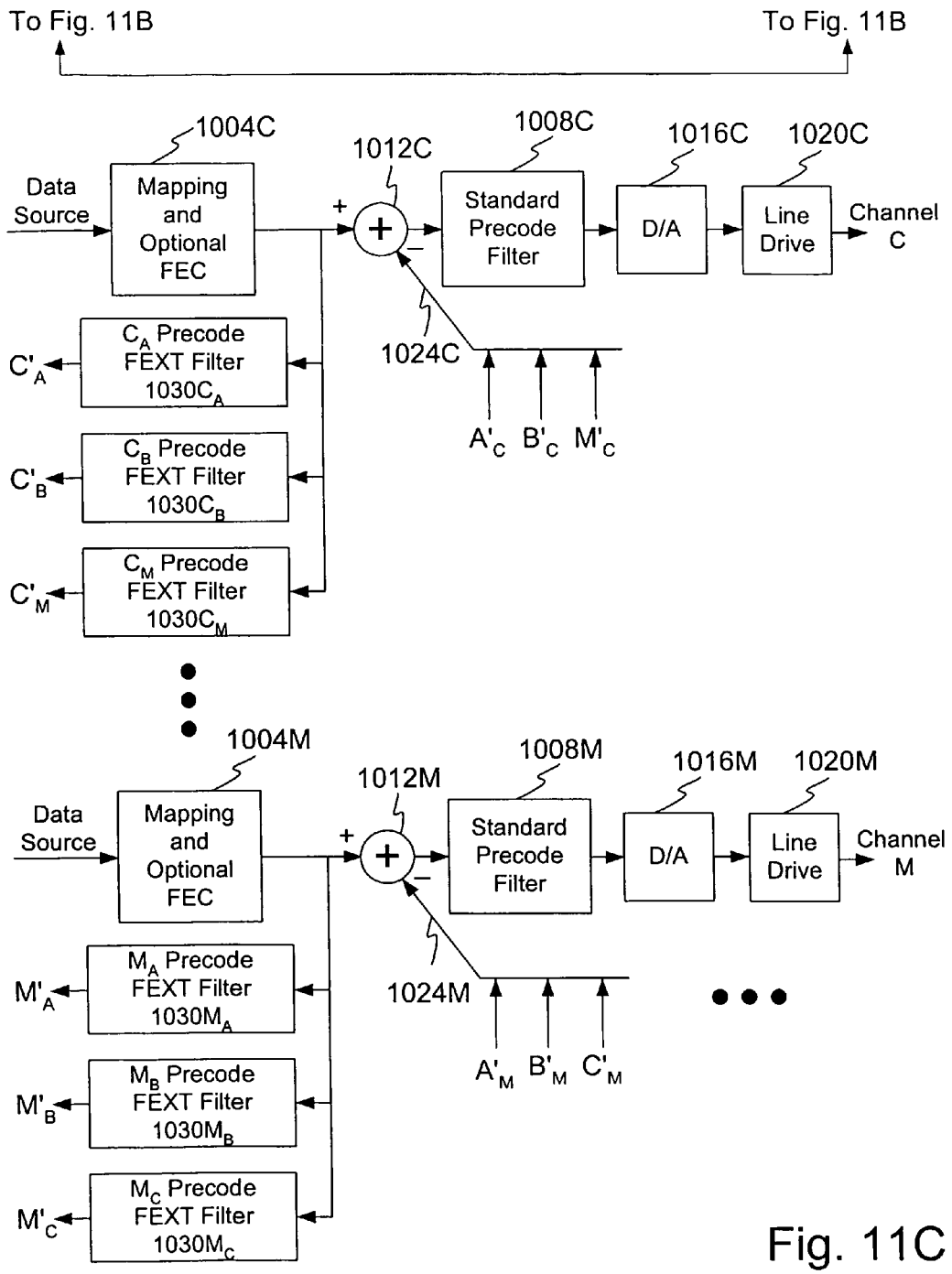

FIG. 10 illustrates a block diagram of an example embodiment of a transmitter configured with a precode FEXT filter system. This example embodiment is configured as a four channel communication device; however, it is contemplated that in other embodiments the principles may be extended to any communication system having two or more channels.

In reference to the channel A transmitter, a data source not shown provides one or more signals to a front-end processing module 1004A, which in this embodiment is configured as a mapping module with optional forward error correction. The output of the front-end processing module 1004A feeds into a transmit precode filter 1008A such as would be utilized to account for intersymbol interference. Any type transmit precode filter 1008A may be utilized. The transmit precode filter may be considered analogous to the transmit precode filter as shown in FIG. 4.

The output of the transmit precode filter 1008A connects to a subtractor 1012A and one or more precode FEXT filters $1030A_B$-$1030A_M$. The output of precode FEXT filters 1030 generate FEXT cancellation signals that are routed to other transmitters at a station so that the generated cancellation signals may be utilized by the transmitters associated with the other channels to precode a portion of the FEXT out of the transmitted signals. For example, precode FEXT filter $1030A_B$ generates a cancellation signal $A'_B$ that represents the FEXT cancellation signal, generated by the signal to be transmitted over channel A, that is provided to the channel B transmitter to precode, i.e., pre-cancel, FEXT coupling that will couple from channel A to channel B. The precode FEXT filters 1030 may comprise any type of filter capable of generating a cancellation signal. In one embodiment, these filters comprise digital filters. In one embodiment, the precode FEXT filters 1030 comprise an adaptive digital filter. In one embodiment, the precode FEXT filters 1030 comprise any type of filter capable of manipulating an input signal to generate a FEXT cancellation signal. The precode FEXT filters 1030 may comprise, but are not limited to, the following types of filters or any variation thereof: finite impulse response filter, infinite impulse response filter or transform domain filter. It is further contemplated that the precode FEXT filter may comprise a transposed or transversal configuration, or any other configuration.

As shown in the transmitter associated with channel A, a subtractor 1012A receives the output from the transmit precode filter 1008A and the cancellation signal from the precode FEXT filters associated with the other channels, namely filters $1030B_A$, $1030C_A$, $1030 M_A$. In one embodiment, the subtractor 1012A subtracts the cancellation signals $B'_A$, $C'_A$ and $M'_A$ from the channel A signal, while in another embodiment the subtractor 1012A adds the cancellation signals $B'_A$, $C'_A$ and $M'_A$ to the channel A signal.

The output of the subtractor 1012A connects to a digital to analog converter 1016A, which in turn provides an analog output to a line driver 1020. The digital to analog converter 1016A and the line driver 1020A operate in a manner as would be understood by one of ordinary skill in the art.

The apparatus associated with the transmitter for channel B, channel C, and channel M operates and comprises generally similar systems and methods of operation. Accordingly, similar reference numbers to those shown for channel A, modified by an appropriate channel identifier, are associated with each of the other channels' transmit systems.

In one embodiment, the precode FEXT filters 1030 located in the two or more transmitters operate in conjunction with the ELFEXT filters described above that are located in the receivers. In such an embodiment, a portion of the FEXT cancellation may occur in the transmitter and a portion may occur in the receiver. In one configuration, one or more of the ELFEXT filter coefficients of the receiver FEXT filter are set to zero or another nominal value. It is contemplated that these coefficients comprise the coefficients that account for the non-causal portion of the FEXT coupling as seen by the receivers. In such an embodiment, it is the precode FEXT filter that cancels the FEXT that would otherwise be canceled by these coefficients. Hence, the precode FEXT filters 1030 may be considered a non-causal filter.

Stated another way, to account for the FEXT coupling on the victim signal that arrives prior to the arrival, at the other receivers, of the disturber signals that generated the FEXT coupling, certain aspects of FEXT cancellation are transferred to the precode FEXT filter that may be located in a transmitter. In one embodiment, the aspects of FEXT cancellation that are transferred to the precode FEXT filter comprise those aspects that cancel non-casual FEXT. This occurs because non-causal FEXT is considered to arrive on the victim channel prior to the arrival, at other receivers in the multi-channel communication system, of the signals on the disturber channels from which the FEXT couples. Hence, the duties performed by one or more coefficients of the ELFEXT filters may be transferred to the precode FEXT filter 1030. As a result, certain coefficients of the FEXT filters located in the receiver may optionally be set to zero. In one embodiment, an identical number of coefficient values are transferred from the ELFEXT filter to the precode FEXT filter. Although any number of coefficients values may be set to zero, in one embodiment, 24 receiver filter coefficients are set to zero. In one embodiment, the number of coefficients set to zero is less than 12. In another embodiment, the number of coefficients set to zero is between 12 and 24. It is also contemplated that more than 24 of the receiver filter coefficients may be set to zero.

In an alternative preferred embodiment shown in FIG. 11, the precode FEXT filters 1030 are located before the transmit precode filter 1008 as shown. This configuration achieves the advantage of simpler training since the standard precode filter is part of the FEXT channel. It is contemplated that one of ordinary skill in the art may arrive at other configurations that do not depart from scope of the claims that follow.

Figure 12A:
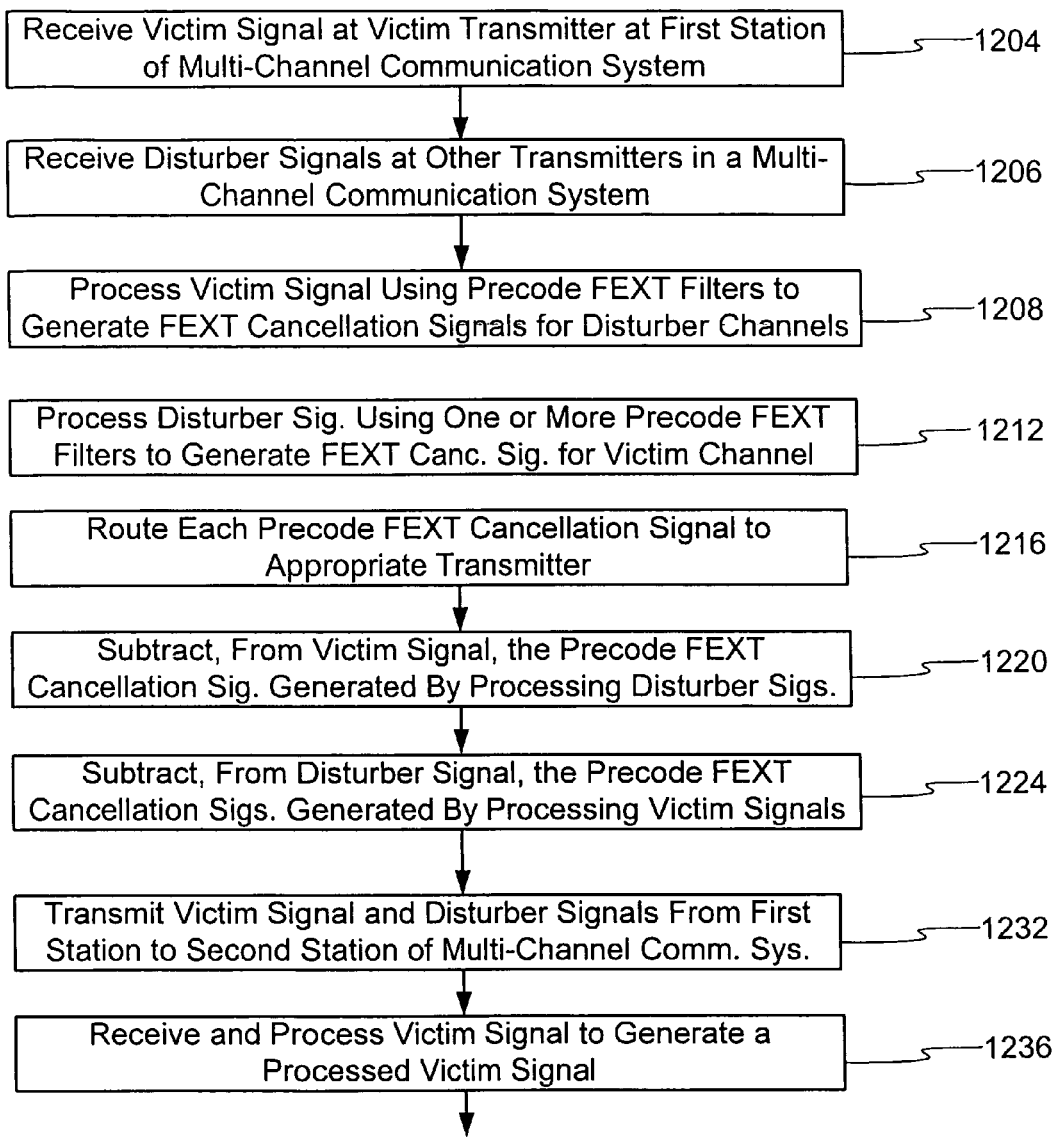
FIGS. 12A and 12B illustrate an operational flow diagram of a general example method of coupling cancellation.
Figure 12B:
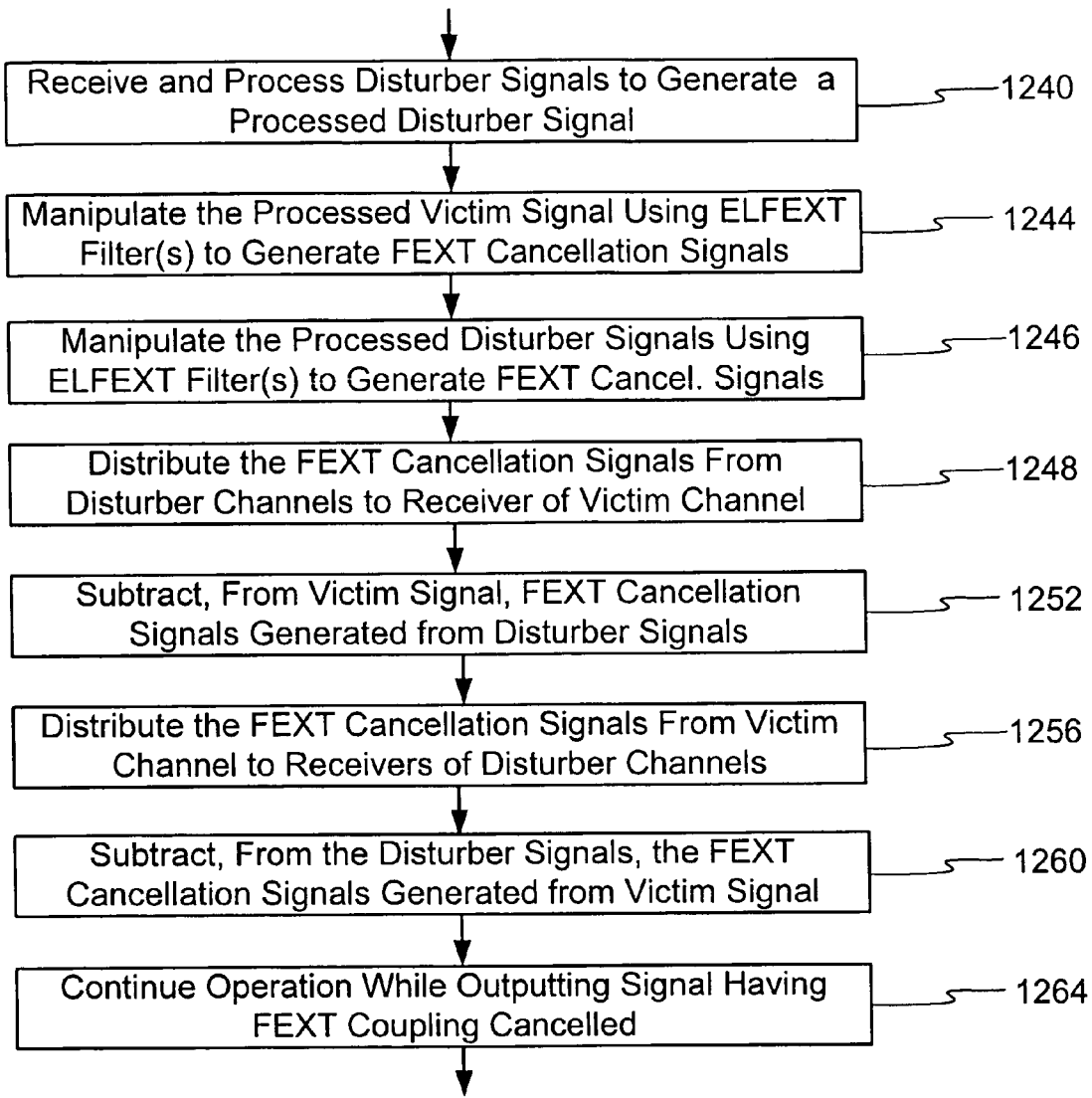

FIGS. 12A and 12B illustrate an operational flow diagram of an example method of operation of one embodiment of the invention. The method of operation shown in FIGS. 12A and 12B encompasses operation of a system having the precode FEXT cancellation and receiver FEXT cancellation capability. It is contemplated, however, that other embodiments may implement only one of these types of FEXT cancellation without departing from the scope of the invention. In reference to FIG. 12A, at a step 1204, a transmitter at a first station of a multi-channel communication system receives a victim signal from a signal source. It is contemplated that the transmitter comprises a victim transmitter because it transmits a signal onto which other signals will couple. Similarly, for purposes of discussion, the victim signal travels through a victim channel and is received by a victim receiver. The term 'victim signal' is utilized to distinguish it from a 'disturber signal,' which is a signal that causes or is responsible for coupling onto the victim signal. A disturber channel is defined to mean a channel that carries a signal that couples onto the victim channel. The disturber signal on the disturber channel is utilized to generate FEXT cancellation signals, which are subtracted from the victim signal either before transmission, after reception, or both. In this embodiment, signals are transmitted from a first station to a second station.

Next or concurrently, at a step 1206, the other transmitters in the multi-transmitter communication system receive disturber signals that are to be transmitted from the first station to a second station. Hence, it is contemplated that multiple signals are simultaneously transmitted over two or more channels.

Thereafter, at a step 1208, the victim transmitter processes the victim signal with one or more precode FEXT filters to generate precode FEXT cancellation signals. The operation and configuration of the precode FEXT filters is discussed above, and thus is not discussed again. At step 1212, the system processes the disturber signals using one or more precode FEXT filters to generate FEXT cancellation signals which will be provided to the victim channel. Thus, in one embodiment, precode FEXT filters in each transmitter process the outgoing signals, which have not yet been transmitted, to generate a cancellation signal for each of the other channels. In one embodiment, a unique precode FEXT cancellation signal is generated by each precode FEXT filter for each of the other channels, while in another embodiment a single signal is generated by each transmitter for use by each channel. In one embodiment, processing by the precode FEXT filter comprises generating a signal that has a transfer function generally equivalent to the non-causal portion of the FEXT which will couple onto the other victim channels to which the particular precode FEXT filter output will be provided. Operation of a filter is generally understood by one of ordinary skill in the art, and hence is not discussed in detail here. At a step 1216, the FEXT cancellation signals from each precode FEXT filter are routed to the appropriate transmitter. Reference to FIGS. 10 and 11 may aid in understanding of the routing of FEXT cancellation signals.

At a step 1220, the system subtracts, from the victim signal, the FEXT cancellation signals generated by processing the disturber signals. Similarly, at a step 1224 the system subtracts, from the disturber signals, the FEXT cancellation signals generated by processing the victim signals. As a result of the subtracting the FEXT cancellation signal from each of the signals on the other channels in the transmitter, the non-causal FEXT coupling is canceled prior to transmission. This provides the advantage of canceling the FEXT coupling that the FEXT filters located in the receiver would be unable to remove because the signal generating the coupling will have not yet arrived at the second station when the cancellation process occurs within receivers.

Next, at step 1224, this process is repeated in the other transmitters. In particular, the system subtracts, from the disturber signal, the FEXT cancellation signals generated by processing of the victim signal. Hence, it is contemplated that all the reference transmitters receives one or more cancellation signals from the other transmitters in the multi-transmitter communication system. In this embodiment, each transmitter associated with a disturber channel provides at least one cancellation signal to the other transmitters of the other channels and the transmitter associated with the victim channel sends at least one cancellation signal to the other transmitters of the other channels. It is contemplated that in some embodiments, only certain transmitters may generate cancellation signals.

At step 1232, the transmitters transmit the victim signal and the disturber signals from the first station to the second station of the multi-channel communication system. In one embodiment, four channels are utilized to transmit four signal. At step 1236, one or more receivers receive and process the victim signal to generate a processed victim signal. The processing may comprise any type of processing that occurs in a receiver. In one embodiment, the processing comprises processing to reduce or eliminate intersymbol interference. In general, this type of processing accounts for the effects of the channel. In other embodiments, resource sharing type processing may occur. As an advantage to the method of operation of this embodiment, the shared processing reduces the computational complexity of burden of the FEXT cancellation filtering done in the receiver. It is contemplated that the processing of step 1236 may occur prior to or after processing of the signal by an ELFEXT filtering.

Turning now to FIG. 12B, at a step 1240, the processed disturber signal is provided to one or more FEXT filters that are located in the disturber receiver. This may be a part of a more involved processing operation, as would be understood in light of FIGS. 6 and 8. Also at a step 1244, one or more receivers receive and process the disturber signals to generate one or more processed disturber signals.

At a step 1244, the receiver system manipulates the processed victim signal using one or more ELFEXT filters to generate FEXT cancellation signals. At a step 1246, the receiver systems manipulate the processed disturber signals using ELFEXT filter(s) to generate FEXT cancellation signals. At a step 1248, the FEXT cancellation signals generated from manipulating the disturber signal are distributed to the receivers associated with the victim channel. Next, at a step 1252, the FEXT cancellation signals generated from the disturber signals are subtracted from the victim signal.

A process similar to step 1248 and 1252 occurs at steps 1256 and 1260 whereby the receivers of the second station distribute the FEXT cancellation signals from the victim channel to receivers associated with the disturber channel. Thereafter, at step 1260, these signals are subtracted from the disturber signals. It is contemplated that this method of operation may occur continuously to cancel FEXT coupling during data transmission between the first station and the second station. At a step 1264, the operation continues in this manner to generate and output a signal having the FEXT coupling cancelled. It is contemplated that each signal can be labeled a disturber signal in relation to one or more of the other signals on the other channels. Hence, each channel suffers from coupling from the other channels, and hence it follows that both channels may be considered a disturber channel and a victim channel, depending on the point of reference.

Figure 13:
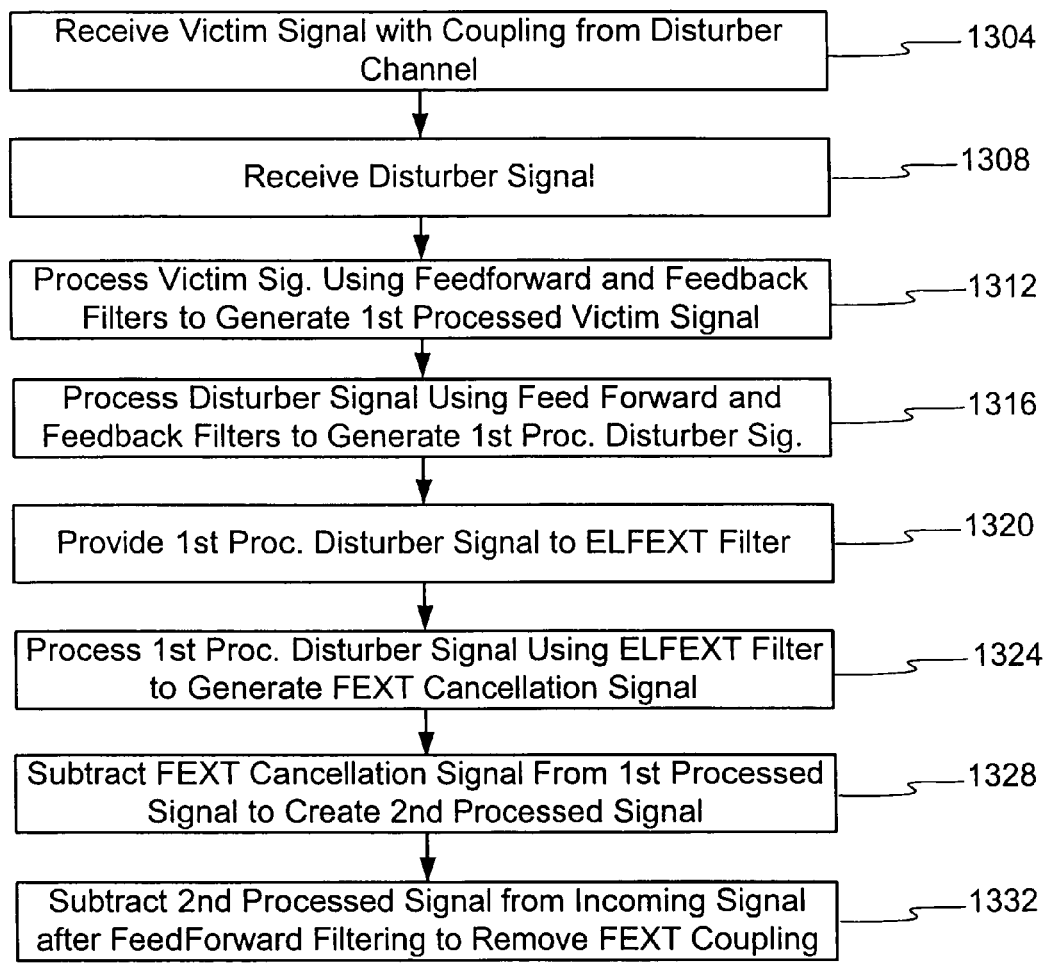
FIG. 13 illustrates an operational flow diagram of particular example method of coupling cancellation.

FIG. 13 illustrates a more detailed operational flow diagram of an example method of operation of the system of FIG. 6. This is but one possible example method of operation and, as such, it is contemplated that other methods, such as those offered in the other figures, may be enabled without departing from the claims that follow. In addition, this example method of operation only discusses removal of coupling from a victim signal, but it is contemplated that this FEXT coupling removal process may occur within any or all of the receivers in a multi-channel communication system. At a step 1304, the receiver receives a victim signal. It is assumed that the victim signal contains unwanted coupling from a disturber channel. Thereafter, at step 1308, the disturber signal is received. The disturber signal is utilized to generate a cancellation signal that when combined with the victim signal, will reduce or eliminate the coupling from the disturber signal to the victim signal.

Accordingly, at a step 1312, the receiver associated with the victim channel utilizes feed-forward and/or feedback filtering to generate a first processed victim signal. Similarly, at step 1316, the receiver associated with the disturber signal utilizes a feed-forward and/or a feedback filter to generate a first processed disturber signal. Processing of the disturber signal with the feed-forward and/or feedback filters aids in signal processing burden when generating the cancellation signal, discussed below, in that the feed-forward and/or feedback filtering accounts for the effects of the channel on the coupling signal while the ELFEXT filter may be trained to account for the coupling and not the effects of the channel.

Thereafter, at a step 1320, the first processed disturber signal is provided to an ELFEXT filter configured to generate, at a step 1324, a cancellation signal that will cancel the coupling from the disturber signal onto the victim signal. The configuration of the ELFEXT filter is described above, and hence a duplicate discussion is not repeated. Next, at a step 1328, the FEXT cancellation signal from the ELFEXT filter is subtracted from the first processed signal to create a second processed signal. In one embodiment, the second processed signal comprises the output of a feedback filter with the cancellation signal subtracted therefrom. At a step 1332, the operation subtracts the second processed signal from the incoming signal, such as after processing by a feed-forward signal, to remove FEXT coupling from the received victim signal. In other embodiments, the second processed signal may be generated in other manners or may be subtracted from the incoming signal at a different stage of processing.

While various embodiments of the invention have been described, it will be apparent to those of ordinary skill in the art that many more embodiments and implementations are possible that are within the scope of this invention.

What is claimed is:

1. A transmitter configured to modify a data signal prior to transmission on a channel by the transmitter to reduce the effects of coupling on the data signal, the transmitter comprising:
    an input configured to receive a data signal, the data signal to be transmitted over a first channel after processing by the transmitter;
    one or more filters configured to generate one or more outgoing cancellation signals, the one or more outgoing cancellation signals to be provided to one or more other transmitters in the transmit system to cancel FEXT coupling from the first channel to one or more other channels prior to transmission of one or more other data signals from the one or more other transmitters; and
    a device configured to combine one or more incoming cancellation signals from the one or more other transmitters with the signal, the one or more incoming cancellation signals arriving from the one or more other transmitters to cancel, prior to transmission of the data signal, FEXT coupling from the one or more other channels to the first channel.

2. The transmitter of claim 1, wherein the device comprises a subtractor configured to subtract the one or more incoming cancellation signals from the data signal.

3. The transmitter of claim 1, wherein the one or more filters comprise digital precode FEXT filters.

4. The transmitter of claim 3, wherein a digital precode FEXT filter is associated with each of the one or more other transmitters and each digital precode FEXT filter is configured to generate an incoming cancellation signal.

5. The transmitter of claim 1, wherein the filter comprises a precode filter configured to cancel FEXT coupling.

6. The transmitter of claim 1, further comprising a transmit precode filter in addition to the one or more filters configured to generate one or more outgoing cancellation signals.

7. A coupling precode filter system configured to modify an outgoing signal in a multi-transmitter, multi-channel environment to cancel, prior to transmission, FEXT coupling that may occur during transmission of the two or more signals through two or more channels comprising:
    a first input configured to receive an outgoing signal;
    a first filter configured to process the outgoing signal to generate a first cancellation signal, wherein the first cancellation signal cancels at least a portion of coupling that will couple from the outgoing signal onto a second signal during transmission;
    a second input configured to receive a second cancellation signal from a precode filter system associated with another channel in the multi-channel environment, wherein the second cancellation signal cancels at least a portion of coupling that will couple from the second signal onto the outgoing signal during transmission; and
    a first device configured to combine the second cancellation signal with the outgoing signal prior to transmission of the outgoing signal.

8. The coupling precode filter system of claim 7, wherein the first filter is a non-causal filter.

9. The coupling precode filter system of claim 7, wherein the first filter is located in a first transmitter and the first transmitter further comprises a transmit precode filter.

10. The coupling precode filter system of claim 7, wherein the first device comprises a subtractor.

11. A method, for use in a multi-channel system having a transmitters associated with each active channel, for FEXT cancellation of coupling from a first signal transmitted on a first channel to a second signal transmitted on a second channel, the method comprising:
    receiving a first signal at a first transmitter;
    routing the first signal to one or more first transmitter cancellation filters;
    performing processing on the first signal with the one or more first transmitter cancellation filters to create a cancellation signal;
    routing the cancellation signal to a second transmitter; and
    combining, prior to transmission, the cancellation signal with a second signal to reduce the effects of coupling of the first signal onto the second signal during transmission of the second signal.

12. The method of claim 11, wherein performing processing comprises precode filtering utilizing a precode FEXT filter.

13. The method of claim 11, wherein the precode FEXT filter is configured as a non-causal filter.

14. The method of claim 11, further comprising receiving a second cancellation signal at the first transmitter and combining the second cancellation signal with the first signal to reduce the effects of coupling from the second signal onto the first processed signal during transmission.

15. The method of claim 11, wherein the combining comprises subtracting the cancellation signal from the second signal.

* * * * *

UNITED STATES PATENT AND TRADEMARK OFFICE
CERTIFICATE OF CORRECTION

| | | |
|---|---|---|
| PATENT NO. | : 7,567,666 B2 | Page 1 of 1 |
| APPLICATION NO. | : 11/650190 | |
| DATED | : July 28, 2009 | |
| INVENTOR(S) | : George A. Zimmerman et al. | |

It is certified that error appears in the above-identified patent and that said Letters Patent is hereby corrected as shown below:

At claim 11, column 22, line 29 please delete "transmitters" and insert --transmitter--.

Signed and Sealed this

Twenty-seventh Day of October, 2009

David J. Kappos
*Director of the United States Patent and Trademark Office*